(12) United States Patent
Tai et al.

(10) Patent No.: US 7,064,158 B2
(45) Date of Patent: *Jun. 20, 2006

(54) ETHYLENE-VINYL ALCOHOL COPOLYMER COMPOSITION AND MULTILAYERED CONTAINER USING THE SAME

(75) Inventors: Shinji Tai, Kurashiki (JP); Hiroyuki Shimo, Kurashiki (JP); Masakazu Nakaya, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 62 days.

This patent is subject to a terminal disclaimer.

(21) Appl. No.: 09/942,665

(22) Filed: Aug. 31, 2001

(65) Prior Publication Data

US 2002/0055572 A1    May 9, 2002

(30) Foreign Application Priority Data

Sep. 1, 2000   (JP) .............................. 2000-266179

(51) Int. Cl.
  *C08K 5/09*  (2006.01)
  *C08L 29/04* (2006.01)
  *B32B 1/00*  (2006.01)

(52) U.S. Cl. ................ 524/398; 524/503; 525/56; 525/57; 428/34.7

(58) Field of Classification Search ........... 524/413, 524/398, 431, 455, 503; 525/56, 57; 428/34.7
See application file for complete search history.

(56) References Cited

U.S. PATENT DOCUMENTS

| | | | |
|---|---|---|---|
| 3,887,649 A | 6/1975 | Takida et al. | |
| 4,264,746 A | 4/1981 | Pritchett | |
| 4,855,181 A * | 8/1989 | Shino et al. | 428/336 |
| 5,164,438 A | 11/1992 | Umeyama et al. | |
| 5,466,748 A | 11/1995 | Ikeda et al. | |
| 5,972,447 A * | 10/1999 | Hata et al. | 428/35.7 |
| 6,033,749 A | 3/2000 | Hata et al. | |
| 6,294,602 B1 | 9/2001 | Shimo et al. | |
| 6,294,609 B1 * | 9/2001 | Bertin et al. | 525/57 |
| 6,599,598 B1 * | 7/2003 | Tai et al. | 428/36.6 |
| 6,759,107 B1 * | 7/2004 | Tai et al. | 428/36.4 |

FOREIGN PATENT DOCUMENTS

| | | |
|---|---|---|
| CN | 1047319 | 11/1990 |
| EP | 0 546 546 | 6/1993 |
| EP | 0 814 126 | 12/1997 |
| EP | 0 854 166 | 7/1998 |
| EP | 0 949 056 | 10/1999 |
| EP | 1 033 080 | 9/2000 |
| JP | 4-211444 | 8/1992 |
| JP | 5-156095 | 6/1993 |
| JP | 5-170980 | 7/1993 |
| JP | 3055851 | 12/1994 |
| JP | 11-348196 | 12/1999 |
| WO | WO 90/14227 | 11/1990 |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

A resin composition comprising 70 to 99.9% by weight of ethylene-vinyl alcohol copolymer (A) and 0.1 to 30% by weight of a thermoplastic resin (B) other than the ethylene-vinyl alcohol copolymer (A) is provided. In the resin composition, an ethylene content ETa (mol %) and a degree of saponification SDa (%) of the ethylene-vinyl alcohol copolymer (A) satisfy the following equations (1) and (2):

$$25 \leq ETa \leq 55 \quad (1)$$

$$90 \leq SDa < 99, \quad (2)$$

and an oxygen absorption rate of the resin composition is 0.01 ml/m²·day or more.

18 Claims, 2 Drawing Sheets

ETHYLENE-VINYL ALCOHOL COPOLYMER COMPOSITION AND MULTILAYERED CONTAINER USING THE SAME

BACKGROUND OF THE INVENTION

1. Field of the Invention

The present invention relates to a resin composition having good gas barrier properties against oxygen, carbon dioxide gas or the like, good moisture-resistance, good aroma retentivity, and good flavor barrier properties, and having an oxygen scavenging function. The present invention also relates to a multilayered container using such a resin composition that has a good appearance, in particular, good transparency, and significantly improved impact delamination resistance.

2. Description of the Related Art

Ethylene-vinyl alcohol copolymer (hereinafter may be abbreviated as EVOH) can be melt-molded, and has excellent gas barrier properties against oxygen or carbon dioxide gas. For this reason, a multilayered structure including a layer made of EVOH and a layer made of a thermoplastic resin having excellent moisture-resistance, mechanical properties or the like (e.g., thermoplastic polyester; hereinafter thermoplastic polyester may be abbreviated as PES) is utilized as various molded products that require gas barrier properties. For example, such a multilayered structure is used in various fields as a multilayered container, in particular, in the form of a bottle. For example, it is widely used in such fields as foods, drinks, medicines, cosmetics, toiletries or the like.

The multilayered container has good barrier properties against oxygen, carbon dioxide gas, and the like. However, the permeability thereof against gas such as oxygen is not exactly zero, unlike metals used for cans, etc. and glass used for bottles, etc. but still permits transmission of gas in an amount that cannot be neglected. In particular, for containers of foods, the degradation of food contents due to oxidation when they are preserved for a long time is of great concern. Therefore, improvement on the oxygen barrier properties is strongly desired.

On the other hand, when filling contents in the container, oxygen may be mixed in the container together with the contents. When the contents are susceptible to oxidization, only a trace amount of oxygen may degrade the quality of the contents. In order to prevent this, providing a material of the container with an oxygen scavenging function has been proposed. In this case, oxygen that might enter from the outside of the container to the inside can be scavenged, so that the gas barrier properties of a packaging material also can be improved.

For example, as the method of providing the oxygen scavenging function to the EVOH that constitutes a packaging material, the following methods are known: (1) An oxidation catalyst such as a transition metal is added to the EVOH to make the EVOH susceptible to oxidation, thereby providing the oxygen scavenging function to the EVOH (Japanese Laid-Open Patent Publication (Tokkai) No.4-211444); (2) A resin composition substantially composed of polyolefin and an oxidation catalyst, that is, polyolefin in a state susceptible to oxidation, is dispersed in the EVOH, thereby providing the oxygen scavenging function to the EVOH (Japanese Laid-Open Patent Publication (Tokkai) No.5-156095); and (3) EVOH, polyolefin, and an oxidation catalyst are blended to make the EVOH and polyolefin susceptible to oxidation, thereby providing the oxygen scavenging function (Japanese Laid-Open Patent Publication (Tokkai) No.5-170980). However, method (1) fails to provide sufficiently improved oxygen barrier properties. Methods (2) and (3) have a drawback in that the transparency is impaired significantly.

Furthermore, in the multilayered containers, especially when an adhesive resin layer is not provided between the layers, delamination between the thermoplastic resin layer (e.g., PES layer) and the EVOH layer is likely to occur, which causes a large problem in the appearance. In order to solve this problem, a multilayered container made of a PES layer and an EVOH composition layer having a specific structure has been proposed (Japanese Laid-Open Patent Publication (Tokkai) No.11-348196). However, the oxygen barrier properties of such a multilayered container still does not exceed the level of a conventional EVOH, and further improvement is in demand.

SUMMARY OF THE INVENTION

A first resin composition of the present invention comprises 70 to 99.9% by weight of EVOH (A) and 0.1 to 30% by weight of a thermoplastic resin (B) other than EVOH (A), wherein an ethylene content $ETa$ (mol %) and a degree of saponification $SDa$ (%) of the EVOH (A) satisfy the following equations (1) and (2):

$$25 \leq ETa \leq 55 \quad (1)$$

$$90 \leq SDa < 99 \quad (2), \text{ and}$$

an oxygen absorption rate of the resin composition is 0.01 ml/m$^2$·day or more.

A second resin composition of the present invention comprises 70 to 99.9% by weight of EVOH (A) and 0.1 to 30% by weight of a thermoplastic resin (B) other than the EVOH (A); wherein the EVOH (A) comprises at least two kinds of EVOHs (a1) and (a2); ethylene contents $ETa1$ (mol %) and $ETa2$ (mol %) and degrees of saponification $SDa1$ (%) and $SDa2$(%) of the EVOHs (a1) and (a2), respectively, satisfy the following equations (3) to (6):

$$25 \leq ETa1 \leq 55 \quad (3)$$

$$90 \leq SDa1 < 99 \quad (4)$$

$$25 \leq ETa2 \leq 55 \quad (5)$$

$$99 \leq SDa2 \quad (6);$$

a weight ratio (a1/a2) of the EVOHs (a1) and (a2) is 5/95 to 95/5; and an oxygen absorption rate of the resin composition is 0.01 ml/m$^2$·day or more.

In a preferred embodiment, the thermoplastic resin (B) contained in the first and second resin compositions comprises a carbon-carbon double bond.

In a preferred embodiment, the first and second resin compositions further comprise a transition metal salt (C).

A third resin composition of the present invention comprises EVOH (A), a thermoplastic resin (B) other than the EVOH (A), and a transition metal salt (C), wherein an ethylene content $ETa$ (mol %) and a degree of saponification $SDa$ (%) of the EVOH (A) satisfy the following equations (1) and (2):

$$25 \leq ETa \leq 55 \quad (1)$$

$$90 \leq SDa < 99 \quad (2), \text{ and}$$

the thermoplastic resin (B) comprises a carbon-carbon double bond.

A fourth resin composition of the present invention comprises EVOH (A), a thermoplastic resin (B) other than the EVOH (A), and a transition metal salt (C); wherein the EVOH (A) comprises at least two kinds of EVOHs (a1) and (a2); ethylene contents ETa1 (mol %) and ETa2(mol %) and degrees of saponification SDa1(%) and SDa 2(%) of the EVOHs (a1) and (a 2), respectively, satisfy the following equations (3) to (6):

$$25 \leq ETa1 \leq 55 \quad (3)$$

$$90 \leq SDa1 < 99 \quad (4)$$

$$25 \leq ETa2 \leq 55 \quad (5)$$

$$99 \leq SDa2 \quad (6);$$

a weight ratio (a1/a2) of the EVOHs (a1) and (a2) is 5/95 to 95/5; and the thermoplastic resin (B) comprises a carbon—carbon double bond.

In a preferred embodiment, the transition metal salt (C) that may be contained in the first and second resin composition and that is contained in the third and fourth composition is contained in the composition in a ratio of 1 to 5000 ppm in terms of metal element, based on a total weight of the EVOH (A) and the thermoplastic resin (B). In a preferred embodiment, the transition metal salt (C) comprises at least one transition metal selected from the group consisting of iron, nickel, copper, manganese, and cobalt.

In a preferred embodiment, the carbon-carbon double bond that may be contained in the thermoplastic resin (B) in the first and second resin compositions and that is contained in the thermoplastic resin (B) in the third and fourth compositions is contained in the thermoplastic resin (B) in a ratio of 0.0001 eq/g or more.

In a preferred embodiment, the thermoplastic resin (B) comprises a unit represented by formula (I):

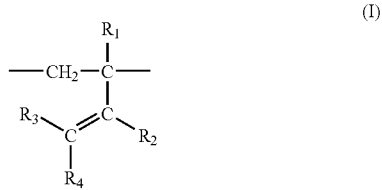

wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —$COOR_5$, —$OCOR_6$, an cyano group or a halogen atom, and $R_5$ and $R_6$ are each independently an alkyl group having 1 to 10 carbon atoms, an aryl group, an alkylaryl group, an arylalkyl group or an alkoxy group.

In a preferred embodiment, a molecular weight of the thermoplastic resin (B) is 1000 to 500000.

In a preferred embodiment, the thermoplastic resin (B) comprises an aromatic vinyl compound unit and a diene compound unit.

In a preferred embodiment, the diene compound unit is at least one of an isoprene unit and a butadiene unit.

In a preferred embodiment, the aromatic vinyl compound unit is a styrene unit.

In a preferred embodiment, the thermoplastic resin (B) is a block copolymer.

In a preferred embodiment, a difference in refractive index between the EVOH (A) and the thermoplastic resin (B) is 0.01 or less.

In a preferred embodiment, particles of the thermoplastic resin (B) are dispersed in a matrix of the EVOH (A).

A multilayered structure of the present invention comprises at least one layer made of any one of the first to fourth resin compositions.

A multilayered container of the present invention comprises at least one layer made of any one of the first to fourth resin compositions and at least one thermoplastic polyester layer.

In a preferred embodiment of the multilayered container, two thermoplastic polyester layers are arranged so as to be in direct contact with both surfaces of the layer made of the resin composition.

In a preferred embodiment, the multilayered container is obtained by coinjection blow molding.

Thus, the present invention described herein makes possible the advantages of (1) providing a resin composition having good gas barrier properties, moisture-resistance, aroma retentivity, and flavor barrier properties, and having an oxygen scavenging function; and (2) providing a multi-layered container including a layer made of the resin composition that has high impact delamination resistance and is useful for storing products that are highly sensitive to oxygen and susceptible to degradation, especially, foods, drinks, medicines, cosmetic, and the like.

DESCRIPTION OF THE PREFERRED EMBODIMENT

Figure 1:
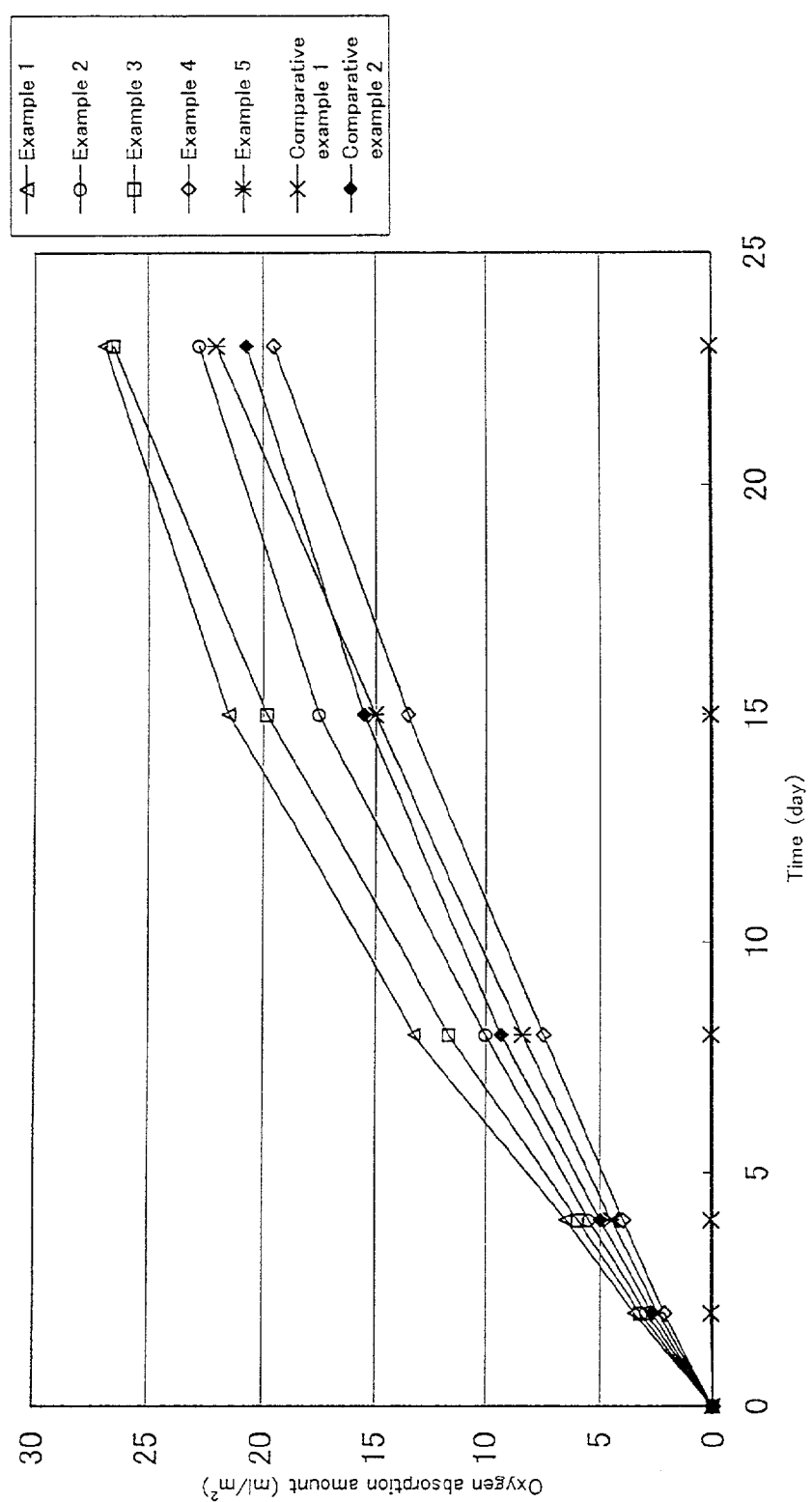
FIG. 1 is a graph in which the oxygen absorption amount of each of the single layer films obtained in Examples 1 to 5 and Comparative Examples 1 and 2 is plotted with respect to time.

In this specification, "scavenging oxygen" means that absorbing and consuming oxygen or reducing the amount of oxygen from a given environment.

[Ethylene-vinyl Alcohol Copolymer (A)]

The ethylene-vinyl alcohol copolymer (A) (EVOH (A)) used in the present invention has a specific ethylene content and degree of saponification, as described below. This EVOH (A) can be obtained by, for example, saponifying a copolymer of ethylene and vinylester or the copolymer further containing other monomers (described later) with an alkali catalyst or the like. A typical compound as the vinylester can be vinyl acetate, but other fatty acid vinylesters (e.g.,vinyl propionate, vinyl pivalate, etc.) also can be used.

The ethylene content ETa (mol %) and the degree of saponification SDa (%) of the EVOH (A) contained in a first resin composition and a third resin composition of the present invention satisfy the following equations (1) and (2):

$$25 \leq ETa \leq 55 \quad (1)$$

$$90 \leq SDa < 99 \quad (2)$$

When the ETa is less than 25 mol %, the gas barrier properties of EVOH (A) under high humidity are degraded, and the melt moldability is also deteriorated. On the other hand, when the ETa exceeds 55 mol %, the gas barrier properties of EVOH (A) are insufficient. The ETa is preferably 30 mol % or more, and more preferably 35 mol % or more. Moreover, the ETa is preferably 50 mol % or less, and more preferably 45 mol % or less. In other words, the range of the ETa is preferably from 30 to 50 mol %, and more preferably from 35 to 45 mol %.

The EVOH (A) contained in a first resin composition and a third resin composition of the present invention has a degree of saponification SDa (%) of less than 99%. The resin composition using such EVOH (A) has good adhesion with other resin, even though an adhesive resin is not used. Therefore, for example, when a multilayered container in which a layer made of the composition of the present invention is in direct contact with a layer made of other resins, such as PES, is produced, the container has sufficient impact delamination resistance.

When the SDa is less than 90 mol %, the gas barrier properties of EVOH (A), especially under high humidity become insufficient. Furthermore, the thermal stability is deteriorated, and gel or aggregates can easily be generated and contained in the obtained molded article. The SDa is preferably 95% or more, more preferably 96% or more. On the other hand, when the SDa exceeds 99%, the impact delamination resistance between the obtained resin composition layer and the PES layer are insufficient. The SDa is preferably 98.5% or less, more preferably 98% or less. In other words, the range of SDa is preferably from 95 to 98.5%, and more preferably from 96 to 98%.

The EVOH (A) contained in a second resin composition and a fourth resin composition of the present invention contains at least two kinds of EVOHs (EVOH (a1) and EVOH (a2)), and the ethylene contents ETa1 (mol %) and ETa2(mol %) and the degrees of saponification SDa1(%) and SDa2(%) of the EVOHs (a1) and (a2), respectively, satisfy the following equations (3) to (6):

$$25 \leq ETa1 \leq 55 \quad (3)$$

$$90 \leq SDa1 < 99 \quad (4)$$

$$25 \leq ETa2 \leq 55 \quad (5)$$

$$99 \leq SDa2 \quad (6)$$

When the ETa1 or the ETa2 is less than 25 mol %, the gas barrier properties of EVOH (A) under high humidity are degraded, and the melt moldability is also deteriorated. On the other hand, when the ETa1 or the ETa2 exceed 55 mol %, the gas barrier properties of EVOH (A) are insufficient. The ETa1 and the ETa2 are preferably 30 mol % or more, and more preferably 35 mol % or more. Moreover, the ETa1 and the ETa2 are preferably 50 mol % or less, and more preferably 45 mol % or less. In other words, the range of the ETa1 and the ETa2 is preferably from 30 to 50 mol %, and more preferably from 35 to 45 mol %.

The degree of saponification SDa1 of EVOH (a1) is less than 99%, and the degree of saponification SDa2 of EVOH (a2) is 99% or more. The resin composition of the present invention that contains such EVOH (A) including such EVOH (a1) and EVOH (a2) is excellent in thermal stability. Furthermore, when the resin composition is formed into a multilayered container including a layer of the composition and a layer of another resin (e.g., PES layer), gas barrier properties and impact delamination resistance of the container are excellent. For example, compared with the case of using only the EVOH having a degree of saponification of 99% or more, the resistance to impact delamination between the resin composition layer and the PES layer is significantly improved. On the other hand, compared with the case of using only the EVOH having a degree of saponification of less than 99%, the gas barrier properties and the thermal stability are improved.

When the SDa1 is less than 90 mol %, the gas barrier properties of EVOH (A), especially under high humidity become insufficient. Furthermore, the thermal stability is deteriorated, and gel or aggregates can easily be generated and contained in the resultant molded article. The SDa1 is preferably 95% or more, more preferably 96% or more. On the other hand, when the SDa1 exceeds 99%, the resistance to the impact delamination between the resultant resin composition layer and the PES layer are insufficient. The SDa1 is preferably 98.5% or less, more preferably 98% or less. In other words, the range of SDa1 is preferably from 95 to 98.5%, and more preferably from 96 to 98%.

When the SDa2 is less than 99 mol %, the gas barrier properties and the thermal stability of the resultant resin composition are degraded. The SDa2 is preferably 99.3% or more, and more preferably 99.5% or more.

The weight ratio (a1/a2) of EVOH (a1) to EVOH (a2) contained in the second resin composition and the fourth resin composition of the present invention is 5/95 to 95/5. When a1/a2 is less than 5/95, the resistance to impact delamination between the resultant resin composition layer and other resin layers (e.g., PES layer) is insufficient. The ratio a1/a 2 is preferably in the range from 10/90 to 90/10, and more preferably 15/85 to 60/40, even more preferably 15/85 to 50/50, in the balance of the gas barrier properties; oxygen scavenging function and the melt moldability of the resin composition; and the impact delamination resistance of a layer made of the resin composition with respect to another resin layer (e.g., PES layer) when the layer of the resin composition and the resin layer form a multilayered container.

In the second resin composition and the fourth resin composition of the present invention, when, in addition to the EVOHs (a1) and (a2), a third EVOH (EVOH (a3)) is further contained, the ethylene content ETa3 (mol %) and the degree of saponification SDa3 of the EVOH (a3) is required to satisfy the following equations (3)' and (4)', or equations (5)' and (6)'. Furthermore, the same applies when a fourth EVOH (EVOH (a4)) is contained.

$$25 \leq ETan \leq 55 \quad (3)'$$

$$90 \leq SDan < 99 \quad (4)'$$

$$25 \leq ETan \leq 55 \quad (5)'$$

$$99 \leq SDan \quad (6)'$$

wherein n is a subscript indicating the $n^{th}$ EVOH and an integer of 3 or more.

In this case, the weight ratio (S1/S2) of the total (S1) of the EVOH (a1) and EVOH (an) satisfying the above equations (3)' and (4)' to the total (S2) of the EVOH (a2) and EVOH (an) satisfying equations (5)'and (6) is 5/95 to 95/5.

When at least two EVOHs are contained, it is preferable that the difference in the ethylene content between the EVOHs having the largest difference in the ethylene content is 25 mol % or less, and the difference in the degree of saponification is 8% or less. When these conditions are not met, the transparency of the resin composition layer may be impaired. The difference in the ethylene content is more preferably 20 mol % or less, and even more preferably 15 mol % or less. The difference in the degree of saponification is more preferably 7% or less, and even more preferably 5% or less.

The ethylene content and the degree of saponification of the EVOH can be measured by nuclear magnetic resonance (NMR).

This EVOH can contain a small amount of a monomer other than ethylene and vinyl alcohol as a copolymer component within the range not interfering with the purposes of the present invention. Examples of such a monomer include: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; vinylsilane compounds such as vinyltrimethoxysilane, vinyltriethoxysilane, vinyltri(β-methoxy-ethoxy)silane, γ-methacryloxypropyltrimethoxysilane; unsaturated sulfonic acids and their salts; alkylthiols; and vinylpyrrolidones.

Among the above, in the case where a vinylsilane compound is contained in EVOH as a copolymer component in an amount of 0.0002 to 0.2 mol %, when the composition of the present invention containing the EVOH is formed into a multilayered structure together with a resin (e.g., PES) as a base resin by coextrusion molding or coinjection molding, the consistency in the melt viscosity of the EVOH with the base resin is improved, so that a uniformly molded article can be produced. As the vinylsilane compound, vinyltrimethoxysilane and vinyltriethoxysilane can be used preferably.

Furthermore, the EVOH containing a boron compound is also effective in improving the melt viscosity of the EVOH, so that uniformly molded articles by coextrusion or coinjection molding can be obtained. Examples of the boron compound include boric acids, boric acid esters, borates, and boron hydrides. Specifically, the boric acids include orthoboric acid (hereinafter may be referred to as "boric acid"), metaboric acid, and tetraboric acid. The boric acid esters include triethyl borate and trimethyl borate. The borates include alkali metal salts, alkaline-earth metal salts of the boric acids, borax, sodium borohydride and the like. Among these compounds, orthoboric acid and sodium borohydride are preferable.

The content of the boron compound, if contained, is preferably in the range of 20 to 2000 ppm, and more preferably 50 to 1000 ppm, in terms of the boron element. With the addition of boron within this range, torque variation in EVOH during melting by heating is suppressed. If the boron content is less than 20 ppm, this effect of adding the boron compound is insufficient. If it exceeds 2000 ppm, gelation tends to occur resulting in poor moldability.

It is also effective to add an alkali metal salt to the EVOH in an amount of 5 to 5000 ppm in terms of the alkali metal element in order to improve the layer adhesions and compatibility. The added amount of the alkali metal salt is more preferably in the range of 20 to 1000 ppm, and more preferably 30 to 500 ppm, in terms of the alkali metal element. The alkali metal in the alkali metal salt includes lithium, sodium, potassium, and the like. Examples of the alkali metal salt include aliphatic carboxylates, aromatic carboxylates, phosphates, and metal complexes of alkali metals. Specifically, they include sodium acetate, potassium acetate, sodium phosphate, lithium phosphate, sodium stearate, potassium stearate, sodium salt of ethylenediaminetetraacetic acid, and the like. Among these, sodium acetate, potassium acetate, and sodium phosphate are most preferable.

It is also preferable to add a phosphorus compound to the EVOH in an amount of 20 to 500 ppm, more preferably 30 to 300 ppm, most preferably 50 to 200 ppm, in terms of the phosphoric acid radicals. When a phosphorus compound is blended with the EVOH in the above range, the thermal stability of the EVOH can be improved. In particular, generation of gelled aggregates and coloring during long-duration melt molding can be suppressed.

The kind of phosphorus compound added to the EVOH is not specifically defined, but various kinds of acids such as phosphoric acid and phosphorous acid and salts thereof may be used. Phosphates may be in the form of primary phosphates, secondary phosphates, or tertiary phosphates, and the cationic species of the phosphates is not specifically defined. The phosphates are preferably alkali metal salts and alkaline-earth metal salts. Among these, it is preferable to add the phosphorus compound in the form of sodium dihydrogenphosphate, potassium dihydrogenphosphate, disodium hydrogenphosphate, or dipotassium hydrogenphosphate.

The melt flow rate (MFR) of the EVOH used in the present invention (210° C., 2160 g load; according to JIS K7210) is in the range of 0.1 to 100 g/10 min, more preferably 0.5 to 50 g/10 min, and even more preferably 1 to 30 g/10 min.

In the present invention, it is also possible to blend to the EVOH a thermal stabilizer, an ultraviolet absorber, an antioxidant, a coloring agent, a filler, and other resins (e.g., polyamides and polyolefins) within the range not interfering with the purposes of the present invention.

[Thermoplastic Resin (B)]

As the thermoplastic resin (B) contained in the first resin composition and the second resin composition of the present invention, any thermoplastic resin can be used, as long as it can increase the oxygen scavenging function of the resultant resin composition by blending it to the EVOH (A) with and without a transition metal salt (C). There is no particular limitation regarding its kind, as long as it is not the EVOH (A). The thermoplastic resin (B) preferably contains a carbon-carbon double bond. Since the carbon-carbon double bond reacts with oxygen efficiently, such a thermoplastic resin (B) has the oxygen scavenging function. The thermoplastic resin (B) contained in the third resin composition and the fourth resin composition of the present invention is required to contain a carbon-carbon double bond. In the present invention, the carbon-carbon double bond encompasses conjugated double bonds, but does not encompass multiple bonds contained in aromatic rings.

The thermoplastic resin (B) preferably contains the carbon—carbon double bond in an amount of 0.0001 eq/g or more, more preferably 0.0005 eq/g (equivalent /g) or more, and even more preferably 0.001 eq/g or more. If the content of the carbon—carbon double bond is less than 0.0001 eq/g, the oxygen scavenging function of the resultant resin composition may not be sufficient.

The carbon-carbon-double bonds may be contained either in the main chain or the side chain of the thermoplastic resin (B), but it is preferable that the amount of the double bonds present in the side chains is larger than the amount of the double bonds present in the main chain(in other words, a larger number of groups having carbon—carbon double bonds exist in the side chains), because of the efficiency of reaction with oxygen. A double bond contained in a structural unit represented by formula (I) is preferable for the carbon-carbon double bond present in the side chains.

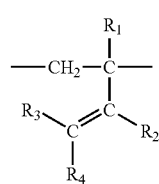

(wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that may be substituted, —$COOR_5$, —$OCOR_6$, an cyano group or a halogen atom, $R_5$ and $R_6$ are each independently an alkyl group having 1 to 10 carbon atoms, an aryl group, an alkylaryl group, an arylalkyl group or an alkoxy group.) The number of carbon atoms of the aryl group is preferably 6 to 10. The number of carbon atoms of the alkylaryl group and the arylalkyl group is preferably 7 to 11. The number of carbon atoms of the alkoxy group is preferably 1 to 10. Examples of the alkyl group include methyl, ethyl, propyl, and butyl. Examples of the aryl group include phenyl. Examples of the alkylaryl group include tolyl. Examples of the arylalkyl group include benzyl. Examples of the alkoxy group include methoxy and ethoxy. Examples of the halogen atom include chlorine.

Among the structural units represented by formula (I), a structural unit derived from a diene compound is preferable. This is because the thermoplastic resin having that structure can be easily produced. Examples of such a diene compound include isoprene, butadiene, 2-ethylbutadiene, and 2-butylbutadiene. One of these can be used, or two or more can be used in combination. Table 1 shows the relationship between an example of a diene compound and a kind of a group in the formula (I) derived from the diene compound.

TABLE 1

|  | $R_1$ | $R_2$ | $R_3$ | $R_4$ |
|---|---|---|---|---|
| Esoprene | $CH_3$ | H | H | H |
|  | H | $CH_3$ | H | H |
| Butadiene | H | H | H | H |
| 2-Ethyl butadiene | $C_2H_5$ | H | H | H |
|  | H | $C_2H_5$ | H | H |
| 2-Butyl butadiene | $C_4H_9$ | H | H | H |
|  | H | $C_4H_9$ | H | H |

Among these, a structural unit containing an alkyl group having 1 to 5 carbon atoms as $R_2$ is preferable because of the efficiency of reaction with oxygen, and a structural unit containing methyl group (i.e., a structural unit derived from isoprene) as $R_2$ is more preferable. Isoprene can be easily available and can be copolymerized with other monomers, so that this is preferable also in view of the production cost for the thermoplastic resin (B). Furthermore, butadiene is also preferable in that it can be easy available and can be copolymerized with other monomers.

When the structural unit represented by formula (I) is derived from a diene compound, the ratio of the structural unit represented by formula (I) to all the structural units derived from the diene compound is preferably 10% or more, more preferably 20% or more, and even more preferably 30% or more. This ratio is made 10% or more by a generally known method in the art of causing anion polymerization of the diene compound in an inactive organic solvent using a Lewis base as a cocatalyst.

In order to obtain the thermoplastic resin (B) having the structural unit represented by formula (I), when polymerizing monomers containing the diene compound, it is preferable to use a Lewis base as a cocatalyst. Examples of the Lewis base include ethers such as dimethyl ether, diethyl ether, methyl ethyl ether, and tetrahydrofran; glycol ethers such as ethylene glycol diethyl ether, and ethylene glycol dimethyl ether; tertiary amines such as N, N, N', N'-tetramethyl ethylene diamine (TMEDA) and triethylene diamine; ether-containing amines such as N-methyl morpholine and N-ethyl morpholine. The Lewis base generally is used in an amount 0.1 to 400 parts by weight with respect to 100 parts by weight of an initiator that will be described later.

The thermoplastic resin (B) contained in the resin composition of the present invention is preferably a copolymer of an aromatic vinyl compound and the diene compound. When the thermoplastic resin (B) is such a copolymer, the carbon-carbon double bond moiety derived from the diene compound easily reacts with oxygen, so that the oxygen barrier properties and the oxygen scavenging function of the resultant composition can be improved. Furthermore, by adjusting the copolymeriziation ratio between the aromatic vinyl compound and the diene compound, the hardness, the moldability and the processability of the thermoplastic resin (B) can be controlled. In addition, the refractive index of the thermoplastic resin (B) can be made a desired value. Therefore it is possible to reduce the difference in the refractive index between the EVOH (A) and the thermoplastic resin (B), and therefore a product having excellent transparency can be obtained.

Examples of the aromatic vinyl compound include styrene, 1-vinylnaphthalene, 2-vinylnaphthalene, 3-vinylnaphthalene, 3-methylstyrene, 4-propylstyrene, 4-cyclohexylstyrene, 4-dodecylstyrene, 2-ethyl-4-benzylstyrene, and 4-(phenylbutyl)styrene. Among these, styrene is the most preferable in view of the cost and the ease of polymerization. As the diene compound, the above-described compounds can be used, for example.

The copolymer of the aromatic vinyl compound and the diene compound may be in any form of a random copolymer, a block copolymer, a graft copolymer, or a composite thereof. A block copolymer is preferable in view of the ease of production and the mechanical properties of the resultant thermoplastic resin (B), the ease of handling, and the oxygen scavenging function.

In the block copolymer, the molecular weight of the aromatic vinyl compound is preferably 300 to 100000, more preferably 1000 to 50000, even more preferably 3000 to 50000. When the molecular weight of the aromatic vinyl compound block is less than 300, the melt viscosity of the thermoplastic resin (B) is low, and the moldability, the processability and the handling properties of the resultant resin composition may be degraded. Furthermore, the mechanical properties of a molded article that is formed from the resin composition may be poor. In addition, the dispersibility of the thermoplastic resin (B) to the EVOH (A) is degraded, and the transparency, the gas barrier properties and the oxygen scavenging function may be degraded. On the other hand, when the molecular weight of the aromatic vinyl compound block exceeds 100000, the melt viscosity of the thermoplastic resin (B) is high, so that the thermoplasticity is impaired. Therefore, the moldability and the processability of the resultant resin composition may be degraded. In addition, the dispersibility of the thermoplastic resin (B) to the EVOH (A) is degraded as above, and the transparency, the gas barrier properties and the oxygen scavenging function may be degraded.

The block form of the block copolymer is for example, $X(YX)_n$, $(XY)_n$ or the like, wherein X is an aromatic vinyl compound block, Y is a diene compound block, and n is an integer of 1 or more. Among these, a diblock copolymer and a triblock copolymer are preferable, and a triblock copolymer is more preferable in view of its mechanical properties. In particular, it is preferable that the aromatic vinyl compound block is a polystyrene block, and the diene compound block is a polyisopropylene block in view of the cost and the ease of polymerization.

There is no particular limitation regarding a method for producing the block copolymer, but anion polymerization is preferable. Specifically, the following methods, but not limited to, can be used. The aromatic vinyl compound and the diene compound are copolymerized with an alkyl lithium compound as an initiator, and coupled by a coupling agent. Alternatively, the diene compound and the aromatic vinyl compound are sequentially polymerized with a dilithium compound as an initiator. As the alkyl lithium compound, alkyl lithium compounds with an alkyl group having 1 to 10 carbon atoms, such as methyl lithium, ethyl lithium, benzyl lithium, n-butyl lithium, sec-butyl lithium, tert-butyl lithium and the like are preferable.

As the coupling agent, dichloromethane, dibromomethane, dichloroethane, dibromoethane, and the like can be used. Examples of the dilithium compound include naphthalenedilithium, oligostyryldilithium and dilithiohexylbenzene. The initiator and the coupling agent can be used preferably in an amount of 0.01 to 0.2 parts by weight and 0.04 to 0.8 parts by weight with respect to 100 parts by weight of all the monomers used for polymerization.

As the solvent for production of the thermoplastic resin (B), an organic solvent that is inactive with respect to the above-described initiators, coupling agents and the Lewis base is used. Among these, a saturated hydrocarbon, a saturated cyclic hydrocarbon, and an aromatic hydrocarbon, each having 6 to 12 carbon atoms are preferable. For example, hexane, heptane, octane, decane, cyclohexane, toluene, benzene, xylene, and the like can be used. The polymerization reaction for production of the thermoplastic resin (B) generally is performed at a temperature range of −20 to 80° C. for 1 to 50 hours.

For example, the thermoplastic resin (B) can be obtained by the following process of dripping a polymerization reaction mixture into a poor solvent such as methanol, causing precipitation, and then heating or drying the recovered precipitate under reduced pressure. Alternatively, the thermoplastic resin (B) can be obtained by the process of dripping a polymerization reaction mixture into boiling water to cause azeotrope to remove the solvent, and then heating or drying the resultant residue under reduced pressure. The double bonds present after polymerization can be partly reduced with hydrogen within the range not interfering with the effects of the resin composition of the present invention.

It is preferable that the tan δ primary dispersion peak temperature of the diene compound block of the thus obtained thermoplastic resin (B) is −40° C. to 60° C., more preferably, −20° C. to 40° C., and even more preferably, −10° C. to 30° C., in view of the oxygen scavenging function of the resultant resin composition. If the tan δ primary dispersion peak temperature is less than −40° C., the oxygen scavenging function of the resultant resin composition may be degraded. On the other hand, if the tan δ primary dispersion peak temperature is more than 60° C., the oxygen scavenging function of the resultant resin composition, in particular, at low temperatures may be degraded.

The molecular weight of the thermoplastic resin (B) is preferably 1000 to 500000, more preferably 10000 to 250000, and even preferably 40000 to 200000. If the molecular weight of the thermoplastic resin (B) is less than 1000, the dispersibility in the EVOH (A) is degraded, so that the transparency, the gas barrier properties and the oxygen scavenging function may be degraded. If the molecular weight of the thermoplastic resin (B) is more than 500000, the processability of the resin composition may be deteriorated, in addition to the above-mentioned problems.

The thermoplastic resin (B) can be a single resin or a mixture of a plurality of resins. In either case, it is preferable that the internal haze value is 10% or less in a film having a thickness of 20 μm in order to obtain a molded article having good transparency.

As to the refractive index of the thermoplastic resin (B) used in the present invention, the difference in the refractive index between the EVOH (A) and the thermoplastic resin (B) is preferably 0.01 or less. If the difference in the refractive index between the EVOH (A) and the thermoplastic resin (B) is more than 0.01, the transparency of the resultant multilayered structure may be poor. The difference in the refractive index is preferably 0.007 or less, and more preferably 0.005 or less. When the EVOH (A) is a blend of at least two kinds of EVOHs having different refractive indices, the calculated average is based on the blend weight ratio and is determined as the refractive index of the blend.

The thermoplastic resin (B) can contain an antioxidant. As the antioxidant, for example, the following compounds can be used: 2,5-di-t-butylhydroquinone, 2,6-di-t-butyl-p-cresol, 4,4,'-thiobis(6-t-butylphenol), 2,2'-methylene-bis(4-methyl-6-t-butylphenol), octadecyl-3-(3',5'-di-t-butyl-4'-hydroxyphenyl)propionate, 4,4'-thiobis(6-t-butylphenol), 2-tert-butyl-6-(3-tert-butyl-2-hydroxy-5-methylbenzyl)-4-methylphenylacrylate, pentaerythritoltetrakis(3-laurylthiopropionate), 2,6-di-(t-butyl)-4-methylphenol (BHT), 2,2'-methylenebis(6-t-butyl-p-cresol), triphenyl phosphite, tris(nonylphenyl) phosphite, dilauryl thiodipropionate and the like.

The amount of the antioxidant to be added is determined as appropriate, in view of the kinds and the contents of components of the resin composition, and the use and the storage conditions of the resin composition, and the like. In general, the amount of the antioxidant contained in the thermoplastic resin (B) is preferably 0.01 to 1% by weight, more preferably 0.02 to 0.5% by weight, based on the total weight of the thermoplastic resin (B) and the antioxidant. If a large amount of antioxidant is added, reaction of the thermoplastic resin (B) and oxygen is blocked, so that the oxygen barrier properties and the oxygen scavenging function of the thermoplastic resin (B) may be insufficient. On the other hand, if the amount of the antioxidant is too small, the reaction with oxygen proceeds during storage or melt-kneading of the thermoplastic resin (B) so that the oxygen scavenging function may be lowered before the resin composition of the present invention is actually put to use.

For example, in the case where the thermoplastic resin (B) is stored at a comparatively low temperature or under an inactive gas atmosphere, or the resin composition is produced by melt-kneading in a nitrogen-sealed state, the amount of the antioxidant can be small. In the case where an oxidation catalyst is added at melt mixing to facilitate oxidation, even though the thermoplastic resin (B) contains a certain amount of an antioxidant, a resin composition having good oxygen scavenging function can be obtained.

The antioxidant may be added in the thermoplastic resin (B) beforehand, or can be added when the components of the resin composition of the present invention are mixed, as in the case of other additives that will be described later.

[Transition Metal Salt]

It is preferable that the first resin composition and the second resin composition of the present invention contain a transition metal salt (C). The third resin composition and the fourth resin composition of the present invention are required to contain a transition metal salt (C). The transition metal salt (C) has an effect of improving the oxygen scavenging function of the resin composition by facilitating the oxidation reaction of the thermoplastic resin (B). For example, the transition metal salt (C) facilitates a reaction of the thermoplastic resin (B) and oxygen present inside a packaging material obtained from the resin composition of the present invention and a reaction of the thermoplastic resin (B) and oxygen that passes through the packaging material, so that the oxygen barrier properties and the oxygen scavenging function can be improved.

Preferably, the transition metal salt (C) is contained in an amount of 1 to 5000 ppm in terms of the metal element. In other words, the transition metal salt (C) is contained in a ratio of 1 to 5000 parts by weight in terms of the metal element with respect to the total amount of the EVOH (A) and the thermoplastic resin (B) of 1,000,000 parts by weight. More preferably, the transition metal salt (C) is contained in the range of 5 to 1000 ppm, and even more preferably 10 to 500 ppm. If the content of the transition metal salt (C) is less than 1 ppm, the effect of the addition is insufficient. On the other hand, if the content of the transition metal salt (C) is more than 5000 ppm, the thermal stability of the resin composition of the present invention may be degraded, and decomposed gas, gels or aggregates are generated significantly.

Examples of the transition metal used for the transition metal salt (C) include, but are not limited to, iron, nickel, copper, manganese, cobalt, rhodium, titanium, chromium, vanadium, and ruthenium. Among these metals, iron, nickel, copper, manganese, and cobalt are preferable, with manganese and cobalt being more preferable, and cobalt being even more preferable.

Examples of counter ions of the metal contained in the transition metal salt (C) include anions derived from organic acids or chlorides. The organic acids include, but are not limited to, acetic acid, stearic acid, acetylacetone, dimethyldithiocarbamic acid, palmitic acid, 2-ethylhexanoic acid, neodecanoic acid, linoleic acid, tallic acid, oleic acid, resin acid, capric acid, and naphthenic acid. Especially preferred salts are cobalt 2-ethylhexanate, cobalt neodecanoate, and cobalt stearate. The metal salt may be a so-called ionomer having a polymeric counter ion.

[Resin Composition]

The first resin composition and the second resin composition of the present invention contain 70 to 99.9% by weight of EVOH (A) and 0.1 to 30% by weight of the thermoplastic resin (B) other than the EVOH (A). If the content of the EVOH (A) is less than 70% by weight, the molded article such as a multilayered container formed of the resin composition has poor transparency and poor gas barrier properties against oxygen gas, carbon dioxide gas or the like. On the other hand, if the content is more than 99.9% by weight, the content of the thermoplastic resin (B) is small, so that the oxygen barrier properties and the oxygen scavenging function are degraded. Preferable contents are 80 to 99% by weight for the EVOH (A) and 1 to 20% by weight for the thermoplastic resin (B), and more preferably, 85 to 98.5% by weight for the EVOH (A) and 1.5 to 15% by weight for the thermoplastic resin (B). In the third composition and the fourth composition of the present invention, preferable contents of the EVOH (A) and the thermoplastic resin (B) are in the same range as above.

The oxygen absorption rate of the first resin composition and the second resin composition of the present invention is required to be 0.01 ml/m$^2$·day or more, preferably 0.05 ml/m$^2$·day or more, and more preferably 0.1 ml/m$^2$·day or more. When the oxygen absorption rate is less than 0.01 ml/m$^2$·day, the oxygen barrier properties and the oxygen scavenging effect of a molded article formed of the resultant resin composition may be insufficient. It is preferable that the third composition and the fourth composition of the present invention also have an oxygen absorption rate of the above-described values or more. The oxygen absorption rate is the volume of oxygen absorbed by a film of the resin composition per unit surface area in a unit period of time, when the film is left to stand in the air with a predetermined volume. A specific method for measuring the rate will be described in the examples later.

The resin composition of the present invention may contain a thermoplastic resin (D) other than the EVOH (A) and the thermoplastic resin (B) to the extent that does not impair the effects of the present invention. Examples of the thermoplastic resin (D) include, but not limited to, the following compounds: polyethylene, polypropylene, ethylene-propylene copolymer, a copolymer including ethylene or propylene (e.g., a copolymer including ethylene or propylene and at least one of the following monomers as a copolymer component: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitrites, their amides, and their anhydrides; vinylesters such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and their salts; alkylthiols; vinyl pyrrolidones and the like), polyolefins such as poly-4-methyl-1-pentene and poly-1-butene; polyesters such as polyethylene terephthalate, polybutylene terephthalate, and polyethylene naphthalate; polystyrene, polycarbonates, and polyacrylates. The thermoplastic resin (D) can be selected depending on the structure and use of the molded articles to be produced.

When selecting the thermoplastic resin (D) contained in the resin composition of the present invention, it is preferable to consider the compatibility between the thermoplastic resin (D) and the EVOH (A) and the thermoplastic resin (B). Such comparability may affect the gas barrier properties, clarity, oxygen scavenging properties, mechanical properties of the resultant product, the texture of the product itself and the like.

In the resin composition of the present invention, various additives can be added within the range not interfering with the function and the effects of the present invention. Examples of such additives include an antioxidant, a plasticizer, a thermal stabilizer (melt stabilizer), a photoinitiator, a deodorant, an ultraviolet absorber, an antistatic agent, a lubricant, a colorant, a filler, a filling agent, a pigment, a dye, a processing aid, a flame retarder, an antifog agent, or other polymer compounds.

Among the above additives, as the thermal stabilizer (melt stabilizer), one or more substances selected from hydrotalcite compounds and metal salts of higher aliphatic carboxylic acids can be used preferably. These compounds can prevent generation of gels or fisheyes, and can further improve the stability in a long time operation. It is preferable that these compounds are contained in an amount of 0.01 to 1 wt % with respect to the whole resin composition.

As the metal salts of higher aliphatic carboxylic acids, metal salts of higher fatty acids having 8 to 22 carbon atoms are preferable. Examples of higher fatty acids having 8 to 22 carbon atoms include lauric acid, stearic acid, and myristic acid. Examples of the metals of the metal salts include sodium, potassium, magnesium, calcium, zinc, barium and aluminum. Among these, alkahne-earth metals such as magnesium, calcium and barium are preferred. Among such metal salts of higher aliphatic carboxylic acids, calcium stearate and magnesium stearate are preferred.

A preferable melt flow rate (MFR) (210° C., 2160 g load, according to JIS K7210) of the resin composition of the present invention is 0.1 to 100 g/10 min., more preferably 0.5 to 50 g/10 min., and even more preferably 1 to 30 g /10 min. When the melt flow rate of the resin composition of the present invention fails to fall within the above range, the processability in melt-molding can become poor in many cases.

It is preferable that in the resin composition of the present invention, the particles of the thermoplastic resin (B) are dispersed in the matrix containing the EVOH (A), if necessary, the transition metal salt (C), the thermoplastic resin (D), various additives and the like. A molded article made of such a resin composition has good transparency, gas barrier properties and oxygen scavenging function. In this case, it is preferable that the average particle size of the thermoplastic resin (B) is 10 µm or less. When the average particle size is more than 10 µm, the area of the interface between the thermoplastic resin (B) and the matrix made of the EVOH (A) and the like becomes small, so that the oxygen gas barrier properties and the oxygen scavenging function may be degraded. The average particle size of the particles of the thermoplastic resin (B) is preferably 5 µm or less, more preferably 2 µm or less.

[Processing of Resin Composition]

The components of the resin composition of the present invention are mixed and formed into a desired product. The method for mixing the components of the resin composition of the present invention is not limited to a particular method. The components can be mixed in any order. For example, when mixing the EVOH (A), the thermoplastic resin (B) and the transition metal salt (C), they can be mixed simultaneously. Alternatively, the thermoplastic resin (B) and the transition metal salt (C) can be mixed, and then the mixture can be mixed with the EVOH (A). Moreover, the EVOH (A) and the transition metal salt (C) can be mixed, and then the mixture can be mixed with the thermoplastic resin (B). Alternatively, the EVOH (A) and the thermoplastic resin (B) can be mixed, and then the mixture can be mixed with the transition metal salt (C). Furthermore, the mixture obtained by mixing the EVOH (A) and the thermoplastic resin (B) can be mixed with the mixture obtained by mixing the EVOH (A) and the transition metal salt (C). When mixing two or more EVOHs as the EVOH (A), the two or more EVOHs can be mixed beforehand. Alternatively, the two or more EVOHs can be mixed with the thermoplastic resin (B) and the transition metal salt (C) simultaneously.

As a specific method of mixing, melt-kneading is preferable because of the simplified process and the cost. In this case, it is preferable to use an apparatus with high kneading ability to allow the components to be finely and uniformly dispersed, because this can provide good oxygen absorption performance and good transparency, and can prevent gels and aggregates from being generated or mixed.

As the apparatus for realizing a high kneading level, continuous kneaders such as a continuous intensive mixer and a kneading type biaxial extruder (unidirectional or bi-directional), a mixing roll, and a Ko-kneader; batch kneaders such as a high-speed mixer, a Banbury mixer, an intensive mixer, or a pressure kneader; an apparatus using a rotary disk having a trituration mechanism such as a stone mill, for example, the KCK Kneading Extruder from KCK Co., Ltd.; a uniaxial extruder provided with a kneading section (e.g., Dulmage and CTM); a simple kneader such as a ribbon blender and a Brabender mixer can be used. Among the above, the continuous intensive mixer is preferable and is available as FCM from Farrel Corp., CIM from The Japan Steel Works, Ltd., and KCM, LCM, and ACM from Kobe Steel, Ltd. It is preferable to use an apparatus equipped with a uniaxial extruder underneath such a kneader to perform kneading and extrusion pelletizing simultaneously. Also as a biaxial kneading extruder equipped with a kneading disk or a kneading rotor, for example, TEX from Japan Steel Works, Ltd., ZSK from Werner & Pfleiderer Corp., TEM from Toshiba Machine Co., Ltd., and PCM from Ikegai Tekko Co, Ltd. can be used.

In these continuous kneaders, the shape of the rotor or disk plays a key role. In particular, the gap between the mixing chamber and the rotor chip or the disk chip (chip clearance) is important. Being too narrow or too wide fails to provide a mixture with a good dispersibility. The optimal chip clearance is in the range of 1 to 5 mm.

The rotational speed of the rotor of the kneader is generally 100 to 1200 rpm, preferably 150 to 1000 rpm, and more preferably 200 to 800 rpm. The inner diameter (D) of the chamber of the kneader is, for example, 30 mm or more, preferably in the range of 50 to 400 mm. The ratio (L/D) of the length (L) to the diameter (D) of the chamber of the kneader is preferably 4 to 30. A single kneader may be used, or two or more kneaders may be coupled for use.

The kneading temperature is generally in the range of 50 to 300° C. It is preferable to perform extrusion at low temperatures with the hopper port sealed with nitrogen in order to prevent oxidation of the thermoplastic resin (B). A longer kneading period provides better results. However, considering the prevention of oxidation of the thermoplastic resin (B) and the production efficiency, the kneading time may be 10 to 600 seconds, preferably 15 to 200 seconds, even more preferably 15 to 150 seconds.

The resin composition of the present invention can be molded into various molded articles such as films, sheets, containers or other packaging materials by using various molding methods as appropriate. In this case, the resin composition of the present invention can be subjected to molding after being formed into pellets, or the components of the resin composition can be subjected directly to molding after being dry-blended.

As molding methods and molded articles, for example, the resin composition of the present invention can be molded into films, sheets, pipes and the like by melt extrusion molding, into containers by injection molding and into bottle-like hollow containers by blow molding. Blow molding includes extrusion blow molding where a parison is formed by extrusion molding and blown for molding, and injection blow molding where a preform is formed by injection molding and blown for molding.

[Multilayered Structure and Multilayered Container]

In the present invention, the molded article produced by the above-described molding methods may be composed of a single layer, but it is preferable that the molded article is in the form of a multilayered structure obtained by laminating a layer of the resin composition of the present invention and other layers, in view of providing characteristics such as mechanical properties, water vapor barrier properties, and further oxygen barrier properties.

Examples of a layer structure of the multilayered structure includes x/y, x/y/x, x/z/y, x/z/y/z/x, x/y/x/y/x, and x/z/y/z/x/z/y/z/x, where x denotes a layer made of a resin other than the resin composition of the present invention, y denotes the resin composition layer of the present invention, and z denotes an adhesive resin layer, but the structure is not limited to these structures. In the case where a plurality of x layers are provided, such layers may be made of the same kind of resin or of different kinds of resin. A recovered resin layer made of scraps generated by trimming during molding may be additionally formed, or such recovered resin may be blended in a layer made of another resin. The thickness of the layers of the multilayered structure is not limited to a particular thickness. However, the ratio of the thickness of the y layer to the total thickness of all the layers is preferably 2 to 20%, in view of the moldability, the cost or the like.

A thermoplastic resin is preferable as a resin used for the x layer in view of the processability or the like. Examples of such a thermoplastic resin include, but are not limited to, the following resins: polyethylene, polypropylene, ethylene-propylene copolymer, a copolymer including ethylene or propylene (e.g., a copolymer including ethylene or propylene and at least one of the following monomers as a copolymer component: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; vinylesters such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and their salts; alkylthiols; vinyl pyrrolidones and the like), polyolefins such as poly-4-methyl-1-pentene and poly-1-butene; polyesters such as polyethylene terephthalate, polybutylene terephthalate, and polyethylene naphthalate; polyamides such as polycaproamide, polyhexamethylene adipamide, and polymetaxylylene adipamide; polyvinylidene chloride, polyvinyl chloride, polystyrene, polyacrylonitrile, polycarbonate, and polyacrylate. Such a thermoplastic resin layer may be a non-oriented layer or a layer subjected to uniaxial or biaxial drawing or rolling.

Among these thermoplastic resins, polyolefins are preferable because of their excellent moisture-resistance, mechanical properties, economy, heat sealing properties and the like. Polyesters are preferable because of excellent mechanical properties, heat resistance or the like.

On the other hand, there is no limitation regarding the adhesive resin used for the z layer, and any adhesive resin can be used, as long as it can bind the layers to each other. However, preferably used are polyurethane or polyester one-component or two-component curing adhesives, and carboxylic acid-modified polyolefin resin. The carboxylic acid-modified polyolefin resin is an olefin polymer or copolymer containing unsaturated carboxylic acids or anhydrides thereof (e.g., maleic anhydride) as a copolymer component; or a graft copolymer obtained by grafting unsaturated carboxylic acids or anhydrides thereof to an olefin polymer or copolymer.

Among these, a carboxylic acid-modified polyolefin resin is more preferable. In particular, when the x layer is a polyolefin resin, the adhesion with the y layer is good. Examples of such a carboxylic acid-modified polyolefin resin include a resin obtained by carboxylic acid modification of polyethylene (low density polyethylene (LDPE), linear low density polyethylene (LLDPE), or very low density polyethylene (VLDPE)), polypropylene, copolymerized polypropylene, an ethylene-vinyl acetate copolymer, and ethylene-(meth)acrylate (for example, methyl acrylate and ethyl acrylate) copolymer.

Examples of the method for producing the multilayered structure include, but are not limited to, extrusion lamination, dry lamination, coinjection molding and coextrusion molding. The coextrusion molding includes coextrusion lamination, coextrusion sheet molding, the coextrusion inflation process, and coextrusion blow molding.

The sheet, film, parison and the like of the thus obtained multilayered structure may further be reheated at a temperature below the melting point of the contained resin and stretched uniaxially or biaxially by thermoforming such as draw forming, rolling, pantographic drawing, tubular film drawing or blow molding, so that stretched molded products can be obtained.

Since the transparency of the resin composition of the present invention is good, it is preferable that the layers of other resin to be laminated have good transparency in order to provide a packaging container that allows its content to be clearly visible. In view of these aspects, it is preferable that the haze of the multilayered structure having the resin composition layer of the present invention is 10% or less, more preferably 5% or less, and even more preferably 3% or less.

The molded articles using the multilayered structure can be used in various applications. In particular, when the multilayered structure is used as multilayered containers, the advantages provided by the multilayered structure are significantly prominent. Furthermore, layers having high water vapor barrier properties are provided on both sides or on the highly humid side of the resin composition layer of the present invention is preferable in that the retention period of the oxygen scavenging function is particularly prolonged, and as a result, very high gas barrier properties can be retained for a long time. On the other hand, the multilayered container having the resin composition layer as the innermost layer is preferable in that the oxygen scavenging function in the container can be exerted promptly.

Furthermore, since the resin composition of the present invention has good transparency, it is suitable for a packaging container that allows its content to be clearly visible. Among such packaging containers, the following two embodiments of packaging containers have a strict requirement for transparency and thus particularly receive a benefit from the resin composition of the present invention. One embodiment is a container composed of a multilayered film having a total thickness of 300 μm or less and including a layer made of the resin composition of the present invention. The other embodiment is a multilayered container including at least one layer made of the resin composition of the present invention and at least one thermoplastic polyester (PES) layer. These containers will be described below in this order.

The container composed of a multilayered film having a total thickness of 300 μm or less and including a layer made of the resin composition of the present invention is a flexible container composed of a multilayered structure having a relatively small total thickness and generally is processed into the form of a pouch or the like. This container has excellent gas barrier properties, and further has a continuous oxygen scavenging function, and the production is simple, so that this container is very useful for packaging of a product that is highly sensitive to oxygen and susceptible to degradation.

In general, for a container that requires good transparency, each of the resins constituting the multilayered structure is thin so that a thin container as a whole can be produced. For example, in the case where crystalline resin such as polyolefin is used, if the thickness is large, the transparency tends to be poor due to scattering in the crystal. On the other hand, if the thickness of the container is small, good transparency can be obtained. In general, a non-oriented crystallized resin exhibits poor transparency, whereas an oriented crystallized resin exhibits good transparency. Such a uniaxially or biaxially oriented film is generally thin. Also from this point of view, a thin multilayered structure tends to exhibit good transparency.

The resin composition of the present invention has very good transparency. Therefore, the resin composition of the present invention can be used suitably as a container composed of a thin multilayered film for which transparency is often required. Even though the transparency of such a thin film deteriorates over time, the extent of the deterioration is small. The thickness of such a multilayered film is not limited to a particular thickness, but is preferably 300 μm or less, more preferably 250 μm or less, and even more preferably 200 μm or less, to retain the good transparency and flexibility. The total thickness of all layers is preferably 10 μm or more, more preferably 20 μm or more, and even more preferably 30 μm or more, in view of the mechanical strength as a container.

When producing the multilayered container with a multilayered film, there is no particular limitations regarding the method for producing the multilayered film. For example, a multilayered film can be formed by laminating the resin composition layer of the present invention and another thermoplastic resin layer by techniques such as dry lamination or coextrusion lamination.

In the case of dry lamination, non-oriented films, uniaxially oriented films, biaxially oriented films, and rolled films can be used. Among these, a biaxially oriented polypropylene film, a biaxially oriented polyethylene terephthalate film and a biaxially oriented polycaproamide film are suitable because of their mechanical strength. The biaxially oriented polypropylene film is particularly preferable also in view of good moisture-resistance. When non-oriented films or uniaxially oriented films are used, the laminated film may further be re-heated and stretched uniaxially or biaxially by thermoforming such as draw forming, rolling, pantographic drawing, or inflation drawing, so that an oriented multilayered film can be formed.

In order to seal the obtained multilayered container, it is preferable to form a layer made of a heat-sealable resin on at least one outermost layer surface of the multilayered film in the process of producing the multilayered film. Polyolefin such as polyethylene and polypropylene may be used as such a heat-sealable resin.

The thus obtained multilayered film can be processed into, for example, a bag shape and thus a packaging container to be filled with a material is obtained. Such a packaging container is flexible and convenient, and has good transparency and oxygen scavenging properties, so that it is significantly useful for packaging of materials that are susceptible to degradation by the presence of oxygen, especially for foods or the like.

The multilayered container including at least one layer made of the resin composition of the present invention and at least one layer made of the PES layer has good transparency, gas barrier properties, and excellent oxygen scavenging function. Therefore, the multilayered container is used in various forms such as a bag-shaped container, a cup-shaped container, or a hollow molded container. Among these, the hollow molded container, especially a bottle, is important.

Bottles made of PES are broadly used as containers for drinks at present. For this use, such bottles are required to prevent the contents from degrading and it is required that the contents, i.e., a drink, is clearly visible by the consumer. Moreover, when oxygen-sensitive drinks such as beer that easily degrade in flavor are to be packaged, the bottles are required to have significantly high gas barrier properties and oxygen scavenging performance.

The multilayered bottle containing at least one layer of the resin composition of the present invention and at least one PES layer is most suitable for the above use because of its advantages of keeping the quality of the content from degrading while retaining the transparency. Regarding the layer structure of the multilayered container, an adhesive resin layer may be provided between the resin composition layer and the PES layer. However, the multilayered container in which the PES layers are in direct contact with both surfaces of the resin composition layer is particularly preferable because the following advantages of the present invention can be provided to a sufficient extent: the transparency is significantly excellent, and the resistance to impact delamination between the resin composition layer and the PES layer is excellent.

As the PES used for the multilayered container of the present invention including the layer made of the thermoplastic resin composition of the present invention and the PES layer, condensation polymers including aromatic dicarboxylic acids or alkyl esters thereof and diols as main components are used. In particular, PES including ethylene terephthalate as the main component is preferable in attaining the purpose of the present invention. More specifically, the total proportion (mol %) of a terephthalic acid unit and an ethylene glycol unit is preferably 70 mol % or more, and more preferably 90 mol % or more, of the total moles of all the structural units of the PES. If the total proportion of the terephthalic acid unit and the ethylene glycol unit is less than 70 mol %, the resultant PES is amorphous, so that the mechanical strength is insufficient. In addition, when the PES is stretched and formed into a container and the contents are hot-filled in the container, the thermal contraction is so large that it may not be put in practical use. Moreover, when solid-phase polymerization is carried out to reduce oligomers contained in the resin, the softened resin tends to stick, which makes production difficult.

If necessary, the above PES may contain a bifunctional compound unit other than the terephthalic acid unit and the ethylene glycol unit within the range in which the above-described problems are not caused. The proportion (mol %) thereof is preferably 30 mol % or less, more preferably 20 mol % or less, and even more preferably 10 mol % or less, of the total moles of all the structural units of the PES.

Examples of such a bifunctional compound unit include a dicarboxylic acid unit, a diol unit, and a hydroxycarboxylic acid unit. Such bifunctional compound units may either be aliphatic, alicyclic, or aromatic bifunctional compound units. Specific examples thereof include a neopentyl glycol unit, a cyclohexanedimethanol unit, a cyclohexanedicarboxylic acid unit, an isophthalic acid unit, and a naphthalenedicarboxylic acid unit.

Among these, an isophthalic acid unit is advantageous since the resultant PES provides a broad range of conditions under which good products can be produced and provides good moldability. This results in a lowered defective production rate. This is also advantageous in that the molded article is prevented from whitening caused by a suppressed crystallization rate. Also preferable are a 1,4-cyclohexanedimethanol unit and 1,4-cyclohexanedicarboxylic acid unit because the resultant molded article has even better strength against dropping. Naphthalene dicarboxylic acid unit is also preferable in that the resultant PES has a high glass transition temperature and the thermal resistance is improved, and the ability of absorbing ultraviolet radiation can be provided. This is especially useful when the content is susceptible to degradation by ultraviolet radiation. For example, this is particularly useful when the content is susceptible to degradation by both oxidation and ultraviolet radiation, such as beer.

In the case of using a polycondensation catalyst during the production of the PES, a catalyst generally used for production of PES may be used. Examples thereof include: antimony compounds such as antimony trioxide; germanium compounds such as germanium dioxide, germanium tetraethoxide, and germanium tetra-n-butoxide; titanium compounds such as titanium tetramethoxide, titanium tetraethoxide, titanium tetra-n-propoxide, titanium tetraisopropoxide, and titanium tetrabutoxide; and tin compounds such as di-n-butyltin dilaurate, di-n-butyltin oxide, and dibutyltin diacetate. These catalysts may be used alone or in combination of two or more. The amount of the polycondensation catalyst used is preferably 0.002 to 0.8% by weight based on the weight of dicarboxylic acid.

Among these, antimony compounds are preferable in view of the cost of the catalyst, and antimony trioxide is especially preferable. On the other hand, germanium compounds are preferable in that the resultant PES has a good color tone, and germanium dioxide is especially preferable. In view of moldability, the germanium compounds are more preferable than the antimony compounds. The PES obtained by the polymerization reaction with an antimony compound as a catalyst has a higher crystallization rate than the case using a germanium compound as a catalyst. This means that in the case of using an antimony compound, crystallization tends to proceed easily by heating during injection molding or blow molding. The resultant bottles are likely to generate whitening and may be poor in transparency. The degree of orientation by drawing may also be lowered, and an intended shape for molded bottles may not be obtained. This narrows the range of conditions under which good products can be produced, which tends to increase the rate of production of defective products.

In particular, when polyethylene terephthalate containing no copolymerized component except for diethylene glycol as a by-product is used as the PES used for the present invention, it is preferable to use a germanium compound as the catalyst to suppress the crystallization rate when producing the PES.

The method for producing the multilayered container of the present invention including at least one layer made of the resin composition and at least one PES layer is not specifically defined, but coinjection blow molding is preferred in view of productivity. In coinjection blow molding, the container is produced by subjecting a multilayered container precursor (parison) obtained by coinjection molding to stretch blow molding.

In the coinjection molding, in general, the resins to constitute the layers of the multilayered structure are guided to a concentric nozzles from two or more injection cylinders and are injected into a single mold simultaneously or alternately at non-synchronized timings, and one clamping operation is performed for molding. For example, parisons are produced by, but not limited to, the following methods: (1) PES layers for the inner and outer layers are first injected, and then the resin composition for the sandwiched layer is injected, and thus a molded container of a three-layered structure of PES/resin composition/PES; and (2) PES layers for the inner and outer layers are first injected, then the resin composition is injected, and the PES layer is injected again simultaneously with the injection of the resin composition or thereafter to form a molded container of a five-layered structure of PES/resin composition/PES/resin composition/PES.

Regarding the conditions for injection molding, the PES is preferably injected at a temperature in the range of 250 to 330° C., more preferably 270 to 320° C., even more preferably 280 to 310° C. If the injection temperature for PES is lower than 250° C., the PES is not sufficiently melted, and the resulting molded articles may have non-molten substances (fisheyes), by which their appearance may be worsened, moreover, which may cause the degradation of the mechanical strength of the molded articles. In addition, in some extreme cases, the screw torque for the PES injection may increase, whereby the molding machine may have operational malfunctions. If the injection temperature for PES exceeds 330° C., PES may be highly decomposed, which may lead to a lowered molecular weight, so that the mechanical strength of the molded articles may be lowered. Moreover, the PES decomposition gives off some vapors of acetaldehyde and the like, and thus the properties of the materials to be filled in the molded articles may be worsened. Moreover, the oligomers resulting from the PES decomposition may contaminate the mold significantly, and the resultant molded articles may have a poor appearance.

The thermoplastic resin composition of the present invention is preferably injected at a temperature in the range of 170 to 250° C., more preferably 180 to 240° C., and even more preferably 190 to 230° C. If the injection temperature for the resin composition is lower than 170° C., the resin composition is not sufficiently melted, and the resulting molded articles may have non-molten substances (fisheyes), and thus their appearance may be worsened. In some extreme cases, the screw torque for the injection of the resin composition may increase, so that the molding machine may have operational malfunctions. On the other hand, if the injection temperature for the resin composition exceeds 250° C., oxidation of the thermoplastic resin (B) may proceed, so that the gas barrier properties and the oxygen scavenging function of the resin composition may be degraded. In addition, the molded articles may be unfavorably colored and contain gelled materials, so that the appearance of the resulting molded articles may be poor. Moreover, the flow of the resin composition being injected will be disordered or blocked by vapors generated through decomposition of the resin composition and by the gelled materials, so that the layer of the resin composition may have failed areas. In some extreme cases, the gelled materials may make it impossible to continue the injection molding operation. In order to suppress the progress of the oxidation of the composition during melting, it is preferable to seal the supply hopper with nitrogen.

The resin composition of the present invention may be first formed into pellets by melt-blending the EVOH (A), the thermoplastic resin (B), and optionally, the transition metal salt (C), and then the pellets may be supplied to the molding machine. Alternatively, the components may be dry-blended, and then the dry blend may be fed to the molding machine.

The temperature of the hot runner parts through which PES and the resin composition run to be injected into the mold is preferably in the range of 220 to 300° C., more preferably 240 to 280° C., even more preferably 250 to 270° C. If the temperature of the hot runner parts is lower than 220° C., PES crystallizes and solidifies in the hot runner parts. If so, the molding operation will become difficult. If the temperature of the hot runner parts exceeds 300° C., oxidation of the thermoplastic resin (B) proceeds so that the gas barrier properties and the oxygen scavenging function of the resin composition may be degraded. In addition, the molded articles may be unfavorably colored and contain gelled materials, so that the appearance of the resulting molded articles may be poor. Moreover, the flow of the resin composition being injected may be blocked by vapors generated through decomposition of the resin composition and by the gelled materials. Thus, the layer of the resin composition may have failed areas. In some extreme cases, the gelled materials may make it impossible to continue the injection molding operation.

It is preferable that the mold temperature is in the range of 0 to 70° C., more preferably 5 to 50° C., even more preferably 10 to 30° C. With this, the crystallization of the PES and the resin composition of the parisons can be suppressed and they are uniformly stretched, so that molded articles having improved delamination resistance, transparency, and good shape retentivity can be obtained. If the mold temperature is lower than 0° C., the dew formed around the mold may worsen the appearance of the parisons, and thus good molded articles may not be obtained. If the mold temperature exceeds 70° C., the crystallization of PES and the resin composition may not be suppressed. As a result, the parisons may fail to be uniformly stretched, and the resistance to delamination between the layers and the transparency of the resultant molded articles are degraded, and it is difficult to obtain molded articles of the intended shape.

The total thickness of the thus obtained parison is preferably in the range of 2 to 5 mm, and the total thickness of the thermoplastic resin composition layer or layers is preferably in the range of 10 to 500 μm in total.

The parison is directly in its high-temperature state, or after having been re-heated with heating means such as a block heater, an infrared heater, or the like, transferred to the next stretch blowing stage. In the stretch blowing stage, the heated parison is stretched one- to five-fold in the machine direction, and thereafter blown one- to four-fold with compressed air or the like so that the injection-blown molded multilayered container of the present invention can be produced. The temperature of the parison is preferably in the range of 85 to 140° C., more preferably 90 to 130° C., even more preferably 95 to 120° C. If the temperature of the parison exceeds 140° C., the PES easily crystallizes, so that the resultant container is whitened and its appearance may become poor. In addition, the delamination of the stretch-blown container will increase unfavorably. On the other hand, if the temperature of the parison is less than 85° C., the PES may be crazed to be pearly, so that the transparency of the resulting container may be lost.

The total thickness of the body part of the thus obtained multilayered container of the present invention generally is in the range of 100 to 2000 μm, preferably 150 to 1000 μm, and may vary depending on the use of the container. In this case, the total thickness of the resin composition layer is preferably in the range of 2 to 200 μm, more preferably 5 to 100 μm.

Thus, the multilayered containers including the layer made of the resin composition of the present invention and the thermoplastic polyester resin layer are obtained. The containers have good transparency and also have excellent gas barrier properties and oxygen scavenging function. The containers are therefore suitable for packaging materials susceptible to degradation in the presence of oxygen, such as foods and medicines. Especially, they can be used most suitably as containers for drinks such as beer.

EXAMPLE

Hereinafter, the present invention will be described by way of examples, but is not limited thereto. In the examples, analysis and evaluation were performed as follows.

(1) Ethylene Content and the Degree of Saponification of EVOH

The ethylene content and the degree of saponification of EVOH were calculated based on the spectrum obtained by $^1$H-NMR (nuclear magnetic resonance) measured using a deuterated dimethyl sulfoxide as a solvent ("JNM-GX-500 Model" manufactured by JEOL Ltd. was used for measurement).

(2) Content of Phosphoric Acid Radicals in EVOH

First, 10 g of dry sample tips were put into 50 ml of 0.01N hydrochloric acid, and the mixture was stirred at 95° C. for 6 hours. The resultant aqueous solution was quantitatively analyzed through ion chromatography to determine the phosphoric acid radical content as the content of phosphoric acid ions ($PO_4^{3-}$). As the column of the chromatography, CIS-A23 manufactured by Yokogawa Electric Corp. was used. As the eluent, an aqueous solution containing 2.5 mM sodium carbonate and 1.0 mM sodium hydrogencarbonate was used. The quantification was based on the calibration curve prepared by using aqueous solutions of phosphoric acid.

(3) Contents of Sodium Salt, Potassium Salt, and Magnesium Salt in EVOH

First, 10 g of sample dry chips were put into 50 ml of 0.01N hydrochloric acid, and the mixture was stirred at 95° C. for 6 hours. The resultant aqueous solution was quantitatively analyzed through ion chromatography to determine the sodium salt, potassium salt, and magnesium salt contents as the respective cation contents in terms of the metal. As the column of the chromatography, ICS-C25 manufactured by Yokogawa Electric Corp. was used. As the eluent, an aqueous solution containing 5.0 mM tartaric acid and 1.0 mM 2,6-pyridinedicarboxylic acid was used. The quantification was based on the calibration curves of aqueous solutions of sodium chloride, potassium chloride, and magnesium chloride, respectively.

(4) Styrene Content of Copolymer, Ratio of Structural Unit Represented by Formula (1) in the Isoprene Block and Content of Carbon—carbon Double Bonds All of these were calculated based on $^1$H-NMR (nuclear magnetic resonance) spectrum measured using a deuterated chloroform as a solvent ("JNM-GX-500 Model" manufactured by JEOL Ltd. was used for measurement). Herein, "styrene content" refers to the ratio (mol %) of styrene to the total monomer units constituting the copolymer. The "ratio of structural unit represented by formula (I) in the isoprene block" refers to the ratio (%) of the structural unit represented by formula (I) (3,4-isoprene unit and 1,2-isoprene unit) to the total structural units derived from isoprene (1,4-isoprene unit, 3,4-isoprene unit, and 1,2-isoprene unit). Further, based on these results, the content of carbon-carbon double bonds was calculated as the molar amount (eq/g) of the double bonds contained in 1 g of the resin.

(5) Melt Flow Rate

Sample resin or resin composition chips were put into a cylinder having an inner diameter of 9.55 mm and a length of 162 mm of a melt indexer, L244 (manufactured by Takara Industry), and were molten therein at 210° C. A load was uniformly applied to the molten resin with a plunger having a weight of 2,160 g and a diameter of 9.48 mm, by which the resin was extruded out of the cylinder through an orifice at its center having a diameter of 2.1 mm. The flow rate (g/10 min) of the resin being extruded, i.e., the melt flow rate, was measured.

(6) Refractive Index of Resin

Sample resin chips were subjected to film extrusion molding at an extrusion temperature of 210° C. so that a non-oriented film having a thickness of 20 μm was obtained. The refractive index of this film was measured using an Abbe refractometer (4T Model manufactured by Atago Co., Ltd., SL-Na-1 Lamp manufactured by Toshiba Corp.).

(7) Haze Value

Sample resin or resin composition chips were subjected to film extrusion molding at an extrusion temperature of 210° C. so that a non-oriented film having a thickness of 20 μm was obtained. The haze value of this film was measured using a Poic integrating-sphere light transmittance/complete light reflectance meter (HR-100 Model manufactured by Murakami Color Technology Laboratories) according to ASTM D1003-61. Multilayered films were also subjected to the above measurement. As for multilayered bottles, the body of the bottle was divided into four portions along the circumference at its center. The internal haze values of the respective four portions were measured and averaged to determine the resulting mean value as the haze value of the bottle.

(8) Contents of Structural Units of PET

The contents of respective structural units of PET were calculated based on $^1$H-NMR (nuclear magnetic resonance) spectrum measured using deuterated trifluoroacetic acid as a solvent ("JNM-GX-500 Model" manufactured by JEOL Ltd. was used for measurement).

(9) Intrinsic Viscosity of PET

A sample film layer was taken out of the PET layer of the body part of a multilayered container and dissolved in a 1/1 (by weight) mixed solvent of phenol and tetrachloroethane. The viscosity of the resultant solution was measured at 30° C. using an Ubbelohde's viscometer (HRK-3 Model from Hayashi Seisakusho).

(10) Melting Point and Glass Transition Temperature of PET

A sample film layer was taken out of the PET layer of the body part of a multilayered container, and the measurement was carried out according to JIS K7121 using a differential scanning calorimeter (DSC) RDC220/SSC5200H Model (manufactured by Seiko Electronics Industry). Specifically, the sample was kept at 280° C. for 5 minutes, cooled to 30° C. at a cooling rate of 100° C./min, kept at the temperature for 5 minutes, and then heated at a heating rate of 10° C./min. For temperature calibration, indium and lead were used. The melting peak temperature (Tpm) and the midway glass transition temperature (Tmg) according to JIS K7121 were obtained, and used as the melting point and the glass transition temperature, respectively.

The following table shows the properties of the EVOHs used in the examples.

TABLE 2

| EVOH | Ethylene content (mol %) | Degree of saponification (%) | MFR (g/10 min)[*1] | Content of phophoric acid radicals (ppm)[*2] | Content of sodium salt (ppm)[*2] | Content of potassium salt (ppm)[*2] | Content of magnesium salt (ppm)[*2] | Refractive index | Haze value (%) |
|---|---|---|---|---|---|---|---|---|---|
| A-11 | 44 | 97.5 | 12.6 | 80 | 75 | 35 | 25 | 1.528 | 0.7 |
| A-12 | 44 | 96.5 | 12.2 | 85 | 70 | 33 | 25 | 1.528 | 0.5 |
| A-13 | 32 | 97.5 | 7.7 | 75 | 50 | 50 | 5 | 1.532 | 0.9 |
| A-21 | 44 | 99.8 | 13.7 | 100 | 80 | 50 | 50 | 1.528 | 1.0 |
| A-22 | 32 | 99.8 | 8.0 | 90 | 50 | 60 | 20 | 1.533 | 1.1 |

[*1]210° C.-2160 g load
[*2]in terms of metal element

As the thermoplastic resin (B), the thermoplastic resin (B-1) prepared by the following production example was used.

PRODUCTION EXAMPLE

First, 600 parts by volume of cyclohexane, 0.16 parts by volume of N, N, N', N'-tetramethyl ethylene diamine (TMEDA) and 0.094 parts by volume of n-butyl lithium as an initiator were introduced into an autoclave equipped with a stirrer purified with dry nitrogen. The temperature was raised to 50° C., and 4.25 parts by volume of styrene monomer was fed thereto for polymerization for 1.5 hours. Next, the temperature was reduced to 30° C., and 120 parts by volume of isoprene was fed thereto for polymerization for 2.5 hours. Furthermore, the temperature was raised again to 50° C., and 4.25 parts by volume of styrene monomer was fed thereto, and polymerization was carried out for 1.5 hours.

Then, as antioxidants, 2-tert-butyl-6-(3-tert-butyl-2-hydroxy-5-methylbenzyl)-4-methylphenyl acrylate and pentaerythritoltetrakis(3-laurylthiopropionate) in an amount of 0.15 parts by weight each with respect to 100 parts by weight of the total of styrene and isoprene were added to the resultant reaction mixture. The reaction mixture was poured to methanol to precipitate a product, which was separated and dried. Thus, a thermoplastic resin (B-1) to which the antioxidants was added was obtained.

The number average molecular weight of the thus obtained styrene-isoprene-styrene triblock copolymer was 85000. The molecular weight of each styrene block in the copolymer was 8500. The styrene content was 14 mol %. The ratio of the structural unit represented by formula (I) in the isoprene block was 55%. The content of carbon-carbon double bonds in the copolymer was 0.014 eq/g. The melt flow rate (210° C.—2160 g load) was 7.7 g/10 min. The thermoplastic resin (B-1) contained 0.12% by weight of 2-tert-butyl-6-(3-tert-butyl-2-hydroxy-5-methylbenzyl)-4-methylphenyl acrylate and 0.12% by weight of pentaerythritoltetrakis(3-laurylthiopropionate). The refractive index of this thermoplastic resin was 1.531, and the haze value was 1.0%.

As the thermoplastic polyester, polyethylene terephthalate (PET) obtained by polymerization with germanium dioxide as a catalyst was used. The contents of terephthalic acid unit, ethylene glycol unit and diethylene glycol unit in this polyethylene terephthalate (referred to as "PET(P-1)") were 50.0 mol %, 48.9 mol %, and 1.1 mol %, respectively. The intrinsic viscosity was 0.83 dl/g, and the melting point and the glass transition temperature were 252° C. and 80° C., respectively.

Example 1

First, 96.5 parts by weight of the EVOH (A-11) shown in Table 2, 3.5 parts by weight of the thermoplastic resin (B-1) and 0.2121 parts by weight of cobalt (II) stearate (0.0200 parts by weight in terms of cobalt atoms) were dry-blended. The blend was extruded into pellets with a 30 mm Φ biaxial extruder (TEX-30SS-30CRW-2V, manufactured by Japan Steel Works, Ltd.) at 210° C., a screw rotational speed of 300 rpm, and an extruded resin amount of 25 kg/hour. These pellets were dried at 30° C. under reduced pressure for 16 hours to give resin composition pellets. The melt flow rate (210° C.—2160 g load) of the resin composition was 11.8 g/10 min. Observation of the cutting plane of the resin composition pellets through an electron microscope confirmed that the thermoplastic resin (B-1) were dispersed in the form of a particle having a size of about 1 μm in the matrix of the EVOH.

The obtained resin composition pellets were extrusion-molded at an extrusion temperature of 210° C. into a film having a thickness of 20 μm. The haze value of the film was 1.0%. Then, 0.9 m² (0.2 m×4.5 m; a surface area of 1.8 m²) of this film was rolled 5 hours after the film was formed and put in a conical flask with an internal volume of 375 ml filled with air of 20° C. and 65% RH. The air in the conical flask contained oxygen and nitrogen in a ratio by volume of 21:79. The opening of the conical flask was sealed with a multilayered sheet including an aluminum layer with an epoxy resin, and then the flask was allowed to stand at 20° C. The air inside was sampled with a syringe 2 days, 4 days and 8 days after the sealing, and the oxygen concentration in this air was measured with gas chromatography. A small hole formed through the multilayered sheet was sealed with an epoxy resin every time the hole was formed. The oxygen decrease amount (oxygen absorption amount) was calculated based on the volume ratio of oxygen and nitrogen obtained by the measurement, and then the results shown in FIG. 1 were obtained. The oxygen absorption rate of the film calculated from the measurement results after 2 days and after 8 days was 1.620 ml/m²·day.

Figure 2:
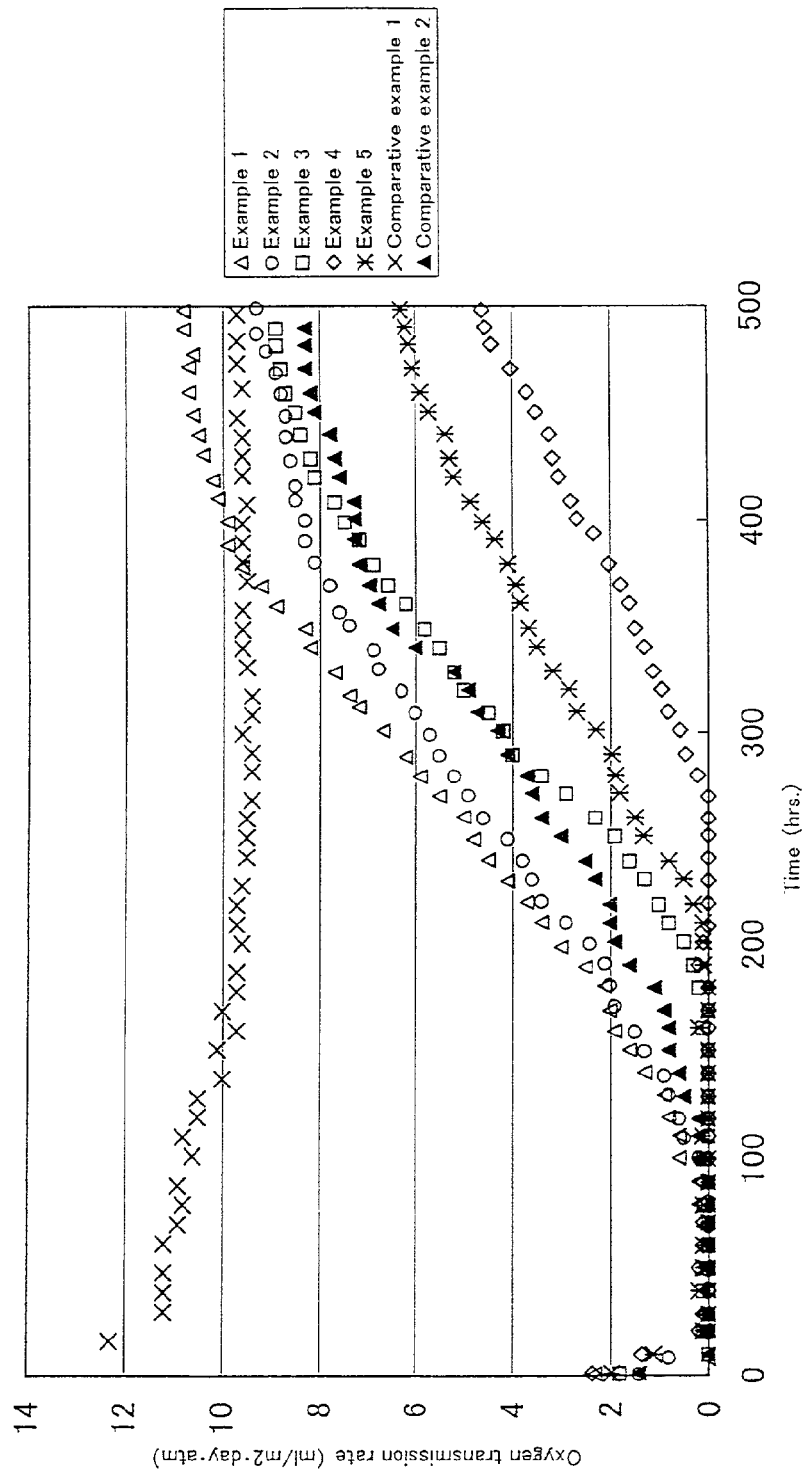
FIG. 2 is a graph in which the oxygen transmission rate of each of the multilayered layer films obtained in Examples 1 to 5 and Comparative Examples 1 and 2 is plotted with respect to time.

Next, oriented polypropylene films each having a thickness of 20 μm (OP-#20 U-1 from Tohcello Co., Ltd.) was laminated on both surfaces of the obtained film with a toluene/methyl ethyl ketone mixed solution (weight ratio of 1:1) of an urethane adhesive (AD335A from Toyo Morton Ltd.) and a curing agent (Cat-10 from Toyo Morton Ltd.) to obtain a multilayered film. The haze value of this multilayered film was 2.2%. The oxygen transmission rate was measured with this multilayered film at an adjusted temperature and humidity of 20° C.—85% RH for 500 hours starting from the point of time of 24 hours after the film formation, using an oxygen transmission amount measurement device (OX-TRAN-2/20A manufactured by Modern Control Corp.). Then, the results shown in FIG. 2 were obtained.

Next, using the resin composition pellets and PET (P-1) obtained in the production example as raw materials and using a coinjection stretch blow molding machine (ASB-50HT Model manufactured by Nissei ASB, for two moldings of 500 ml each), a three-layered parison comprising two kinds of resin of PET/resin composition/PET was obtained. The temperature of the PET injector was 280° C. The temperature of the resin composition injector was 205° C. The temperature of the hot runner block portion in which the PES and the resin composition were combined was 255° C. The temperature of the injection mold core was 15° C., and the temperature of the injection mold cavity was 15° C. The cycle time was 40 seconds. Thereafter, the parison was heated to 105° C. at its surface, and subjected to stretch blow molding to obtain a three-layered coinjection blow-molded bottle composed of two kinds of resin. In the body part of the bottle, the mean thickness of the inner PES layer, the intermediate layer of the resin composition and the outer PES layer were 100 μm, 25 μm and 150 μm, respectively. The haze value of this bottle was 2.0%.

The temperature and the humidity of the obtained bottle were adjusted to 20° C.—65% RH for the outside of the bottle and 20° C.—100% RH for the inside thereof. Using an oxygen transmission amount measurement device (OX-TRAN- 10/50A manufactured by Modern Control Corp.), the oxygen transmission rate per container 10 days after the molding was measured and the result was 0.00 ml/container·day·atm.

Separately, water was filled in the bottle as the contents, and the bottle was airtightly closed under atmospheric pressure. This bottle with its body in the horizontal direction was spontaneously dropped only one time from a height of 30 cm to a triangular prism stand having a length of 20 cm and a corner with an angle of 90° such that the center of the body of the bottle fell on the corner of 90° of the triangular prism. For one kind of bottle, 100 bottles were tested, and the delamination incidence rate Rd (%) was calculated from the following equation with the number of bottles Nd in which delamination occurred. The result was 12%.

$$Rd = (Nd/100) \times 100$$

Example 2

First, 19.5 parts by weight of the EVOH (A-12) and 78.0 parts by weight of EVOH (A-21) shown in Table 2, 2.5 parts by weight of the thermoplastic resin (B-1), and 0.2121 parts by weight of cobalt (II) stearate (0.0200 parts by weight in terms of the cobalt atoms) were used to obtain a resin composition in the same manner as in Example 1. The melt flow rate (210° C.—2160 g load) of this resin composition was 12.7 g/10 min. Observation of the cutting plane of the resin composition pellets through an electron microscope confirmed that the thermoplastic resin (B-1) were dispersed in the form of a particle having a size of about 1 µm in the matrix of the EVOH.

A film having a thickness of 20 µm was obtained from this resin composition in the same manner as in Example 1. The haze value was measured and found to be 1.2%. When the oxygen absorption amount was measured, the results shown in FIG. 1 were obtained. The oxygen absorption rate of the film was 1.176 ml/m²·day. Next a multilayered film was produced in the same manner as in Example 1. The haze value was measured and found to be 2.5%. When the oxygen transmission rate was measured over time, the results shown in FIG. 2 were obtained.

Furthermore, a bottle was obtained in the same manner as in Example 1. The haze value was measured and found to be 2.3%. When the oxygen transmission rate of this bottle was measured in the same manner as in Example 1, the result was 0.00 ml/container·day·atm. When the dropping test was conducted in the same manner as in Example 1, the delamination incidence rate was 8%.

Example 3

First, 38.0 parts by weight of the EVOH (A-12) and 57.0 parts by weight of EVOH (A-21), 5.0 parts by weight of the thermoplastic resin (B-1), and 0.2121 parts by weight of cobalt (II) stearate (0.0200 parts by weight in terms of the cobalt atoms) were used to obtain a resin composition in the same manner as in Example 1. The melt flow rate (210° C.—2160 g load) of this resin composition was 12.0 g/10 min. Observation of the cutting plane of the resin composition pellets through an electron microscope confirmed that the thermoplastic resin (B-1) were dispersed in the form of a particle having a size of about 1 µm in the matrix of the EVOH.

A film having a thickness of 20 µm was obtained from this resin composition in the same manner as in Example 1. The haze value was measured and found to be 1.1%. When the oxygen absorption amount was measured, the results shown in FIG. 1 were obtained. The oxygen absorption rate of the film was 1.398 ml/m²·day. Next a multilayered film was produced in the same manner as in Example 1. The haze value was measured and found to be 2.3%. When the oxygen transmission rate was measured over time, the results shown in FIG. 2 were obtained.

Furthermore, a bottle was obtained in the same manner as in Example 1. The haze value was measured and found to be 2.1%. When the oxygen transmission rate of this bottle was measured in the same manner as in Example 1, the result was 0.00 ml/container·day·atm. When the dropping test was conducted in the same manner as in Example 1, the delamination incidence rate was 17%.

Example 4

First, 19.2 parts by weight of the EVOH (A-12) and 76.8 parts by weight of EVOH (A-22) shown in Table 2, 4.0 parts by weight of the thermoplastic resin (B-1), and 0.2121 parts by weight of cobalt (II) stearate (0.0200 parts by weight in terms of the cobalt atoms) were used to obtain a resin composition in the same manner as in Example 1. The melt flow rate (210° C.—2160 g load) of this resin composition was 8.7 g/10 min. Observation of the cutting plane of the resin composition pellets through an electron microscope confirmed that the thermoplastic resin (B-1) were dispersed in the form of a particle having a size of about 1 µm in the matrix of the EVOH.

A film having a thickness of 20 µm was obtained from this resin composition in the same manner as in Example 1. The haze value was measured and found to be 1.4%. When the oxygen absorption amount was measured, the results shown in FIG. 1 were obtained. The oxygen absorption rate of the film was 0.883 ml/m²·day. Next a multilayered film was produced in the same manner as in Example 1. The haze value was measured and found to be 2.6%. When the oxygen transmission rate was measured over time, the results shown in FIG. 2 were obtained.

Furthermore, a bottle was obtained in the same manner as in Example 1. The haze value was measured and found to be 2.4%. When the oxygen transmission rate of this bottle was measured in the same manner as in Example 1, the result was 0.00 ml/container·day·atm. When the dropping test was conducted in the same manner as in Example 1, the delamination incidence rate was 19%.

Example 5

First, 95.0 parts by weight of the EVOH (A-13) shown in Table 2, 5.0 parts by weight of the thermoplastic resin (B-1) and 0.2121 parts by weight of cobalt (II) stearate (0.0200 parts by weight in terms of the cobalt atoms) were used to obtain a resin composition in the same manner as in Example 1. The melt flow rate (210° C.—2160 g load) of this resin composition was 7.2 g/10 min. Observation of the cutting plane of the resin composition pellets through an electron microscope confirmed that the thermoplastic resin (B-1) were dispersed in the form of a particle having a size of about 1 µm in the matrix of the EVOH.

A film having a thickness of 20 µm was obtained from this resin composition in the same manner as in Example 1. The haze value was measured and found to be 1.1%. When the oxygen absorption amount was measured, the results shown in FIG. 1 were obtained. The oxygen absorption rate of the film was 0.993 ml/m²·day. Next a multilayered film was produced in the same manner as in Example 1. The haze value was measured and found to be 2.3%. When the oxygen transmission rate was measured over time, the results shown in FIG. 2 were obtained.

Furthermore, a bottle was obtained in the same manner as in Example 1. The haze value was measured and found to be 2.2%. When the oxygen transmission rate of this bottle was measured in the same manner as in Example 1, the result was 0.00 ml/container·day·atm. When the dropping test was conducted in the same manner as in Example 1, the delamination incidence rate was 14%.

Comparative Example 1

EVOH (A-21) was used alone to obtain a film having a thickness of 20 µm in the same manner as in Example 1. The haze value was measured and found to be 0.9%. When the oxygen absorption amount was measured, the results shown in FIG. 1 were obtained. The oxygen absorption rate of the film was 0.000 ml/m²·day. Next a multilayered film was produced in the same manner as in Example 1. The haze value was measured and found to be 2.1%. When the oxygen transmission rate was measured over time, the results shown in FIG. 2 were obtained.

Furthermore, a bottle was obtained in the same manner as in Example 1. The haze value was measured and found to be 2.1%. When the oxygen transmission rate of this bottle was measured in the same manner as in Example 1, the result was 0.03 ml/container·day·atm. When the dropping test was conducted in the same manner as in Example 1, the delamination incidence rate was 64%.

Comparative Example 2

First, 97.5 parts by weight of the EVOH (A-21), 2.5 parts by weight of the thermoplastic resin (B-1) and 0.2121 parts by weight of cobalt (II) stearate (0.0200 parts by weight in terms of the cobalt atoms) were used to obtain a resin composition in the same manner as in Example 1. The melt flow rate (210° C., 2160 g load) of this resin composition was 13.5 g/10 min. Observation of the cutting plane of the resin composition pellets through an electron microscope confirmed that the thermoplastic resin (B-1) were dispersed in the form of a particle having a size of about 1 μm in the matrix of the EVOH.

A film having a thickness of 20 μm was obtained from this resin composition in the same manner as in Example 1. The haze value was measured and found to be 1.5%. When the oxygen absorption amount was measured, the results shown in FIG. 1 were obtained. The oxygen absorption rate of the film was 1.104 ml/m²·day. Next, a multilayered film was produced in the same manner as in Example 1, and when the haze value was measured, the result was 2.7%. When the oxygen transmission rate was measured over time, the results shown in FIG. 2 were obtained.

Furthermore, a bottle was obtained in the same manner as in Example 1. The haze value was measured and found to be 2.5%. When the oxygen transmission rate of this bottle was measured in the same manner as in Example 1, the result was 0.00 ml/container·day·atm. When the dropping test was conducted in the same manner as in Example 1, the delamination incidence rate was 89%.

Table 3 shows the components of the above-described resin compositions, and Table 4 shows the results of the various evaluations.

TABLE 3

| | Resin composition | | | | | |
|---|---|---|---|---|---|---|
| | EVOH(A) | | | | Thermoplastic resin (B) | Transition metal salt (C) (ppm)*³ |
| | EVOH(a1) | parts by weight | EVOH(a2) | parts by weight | (parts by weight) | |
| Example 1 | A-11 | 96.5 | — | — | 3.5 | 200 |
| Example 2 | A-12 | 19.5 | A-21 | 78.0 | 2.5 | 200 |
| Example 3 | A-12 | 38.0 | A-21 | 57.0 | 5.0 | 200 |
| Example 4 | A-12 | 19.2 | A-22 | 76.8 | 4.0 | 200 |
| Example 5 | A-13 | 95.0 | — | — | 5.0 | 200 |
| Comparative example 1 | — | — | A-21 | 100.0 | — | — |
| Comparative example 2 | — | — | A-21 | 97.5 | 2.5 | 200 |

*³in terms of metal element

TABLE 4

| | Resin composition | | | Multilayered film | Bottle | | |
|---|---|---|---|---|---|---|---|
| | MFR (g/10 min)*⁴ | Haze value (%) | Oxygen absorption rate (ml/m² · day) | Haze value (%) | Haze value (%) | Oxygen transmission rate (ml/container · day · atm) | Delamination incidence rate (%) |
| Example 1 | 11.8 | 1.0 | 1.620 | 2.2 | 2.0 | 0.00 | 12 |
| Example 2 | 12.7 | 1.2 | 1.176 | 2.5 | 2.3 | 0.00 | 8 |
| Example 3 | 12.0 | 1.1 | 1.398 | 2.3 | 2.1 | 0.00 | 17 |
| Example 4 | 8.7 | 1.4 | 0.883 | 2.6 | 2.4 | 0.00 | 19 |
| Example 5 | 7.2 | 1.1 | 0.993 | 2.3 | 2.2 | 0.00 | 14 |
| Comparative example 1 | — | 0.9 | 0.000 | 2.1 | 2.1 | 0.03 | 64 |
| Comparative example 2 | 13.5 | 1.5 | 1.104 | 2.7 | 2.5 | 0.00 | 89 |

*⁴210° C.-2160 g load

From the results of Table 4, the films obtained by the present invention have good transparency and excellent oxygen scavenging properties. The multilayered containers obtained with these films hardly transmits oxygen and has excellent impact resistance so that delamination does not occur.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A resin composition comprising ethylene-vinyl alcohol copolymer (A), a thermoplastic resin (B) other than the ethylene-vinyl alcohol copolymer (A), and a transition metal salt (C), wherein the ethylene-vinyl alcohol copolymer (A) is contained in an amount of 70 to 99.9% by weight and the thermoplastic resin (B) is contained in an amount of 0.1 to 30% by weight, an ethylene content ETa (mol %) and a degree of saponification SDa (%) of the ethylene-vinyl alcohol copolymer (A) satisfy the following equations (1) and (2):

$$25 \leq ETa \leq 55 \quad (1)$$

$$90 \leq SDa < 99 \quad (2),$$

the thermoplastic resin (B) comprises a carbon-carbon double bond which does not encompass multiple bonds contained in aromatic rings, and the transition metal salt (C) is contained in a ratio of 1 to 5000 ppm in terms of metal element, based on a total weight of the ethylene-vinyl alcohol copolymer (A) and the thermoplastic resin (B).

2. A resin composition comprising ethylene-vinyl alcohol copolymer (A), a thermoplastic resin (B) other than the ethylene-vinyl alcohol copolymer (A), and a transition metal salt (C), wherein the ethylene-vinyl alcohol copolymer (A) is contained in an amount of 70 to 99.9% by weight and the thermoplastic resin (B) is contained in an amount of 0.1 to 30% by weight, the ethylene-vinyl alcohol copolymer (A) comprises at least two kinds of ethylene-vinyl alcohol copolymers (a1) and (a2), ethylene contents ETa1(mol %) and ETa2(mol %) and degrees of saponification SDa1(%) and SDa2(%) of the ethylene-vinyl alcohol copolymers (a1) and (a2), respectively, satisfy the following equations (3) to (6):

$$25 \leq ETa1 \leq 55 \quad (3)$$

$$90 \leq SDa1 < 99 \quad (4)$$

$$25 \leq ETa2 \leq 55 \quad (5)$$

$$99 \leq SDa2 \quad (6),$$

a weight ratio (a1/a 2) of the ethylene-vinyl alcohol copolymers (a1) and (a2) is 5/95 to 95/5, the thermoplastic resin (B) comprises a carbon-carbon double bond which does not encompass multiple bonds contained in aromatic rings, and the transition metal salt (C) is contained in a ratio of 1 to 5000 ppm in terms of metal element, based on a total weight of the ethylene-vinyl alcohol copolymer (A) and the thermoplastic resin (B).

3. The resin composition of claim 2, wherein the transition metal salt (C) comprises at least one transition metal selected from the group consisting of iron, nickel, copper, manganese, and cobalt.

4. The resin composition of claim 2, wherein the thermoplastic resin (B) comprises a carbon-carbon double bond in a ratio of 0.0001 eq/g or more.

5. The resin composition of claim 2, wherein the thermoplastic resin (B) comprises a unit represented by formula (I)

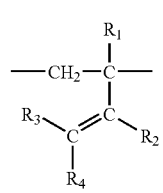

(I)

wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —$COOR_5$, —$OCOR_6$, an cyano group or a halogen atom, and $R_5$ and $R_6$ are each independently an alkyl group having 1 to 10 carbon atoms, an aryl group, an alkylaryl group, an arylalkyl group or an alkoxy group.

6. The resin composition of claim 2, wherein a number average molecular weight of the thermoplastic resin (B) is 1000 to 500000.

7. The resin composition of claim 2, wherein the thermoplastic resin (B) comprises an aromatic vinyl compound unit and a diene compound unit.

8. The resin composition of claim 7, wherein the diene compound unit is at least one of an isoprene unit and a butadiene unit.

9. The resin composition of claim 7, wherein the aromatic vinyl compound unit is a styrene unit.

10. The resin composition of claim 7, wherein the thermoplastic resin (B) is a block copolymer.

11. The resin composition of claim 2, wherein the thermoplastic resin (B) is a styrene-isoprene block copolymer.

12. The resin composition of claim 2, wherein a difference in refractive index between the ethylene-vinyl alcohol copolymer (A) and the thermoplastic resin (B) is 0.01 or less, and wherein the refractive index of the ethylene-vinyl alcohol copolymer (A) is an average that is calculated based on the weight ratio of the at least two kinds of ethylene-vinyl alcohol copolymers (a1) and (a2).

13. The resin composition of claim 2, wherein particles of the thermoplastic resin (B) are dispersed in a matrix of the ethylene-vinyl alcohol copolymer (A).

14. A resin composition comprising ethylene-vinyl alcohol copolymer (A), a thermoplastic resin (B) other than the ethylene-vinyl alcohol copolymer (A), and a transition metal salt (C), wherein the ethylene-vinyl alcohol copolymer (A) is contained in an amount of 70 to 99.9% by weight and the thermoplastic resin (B) is contained in an amount of 0.1 to 30% by weight, the ethylene-vinyl alcohol copolymer (A) comprises at least two kinds of ethylene-vinyl alcohol copolymers (a1) and (a2), ethylene contents ETa1 (mol %) and ETa2 (mol %) and degrees of saponification SDa1(%) and SDa2(%) of the ethylene-vinyl alcohol copolymers (a1) and (a2), respectively, satisfy the following equations (3) to (6):

$$25 \leq ETa1 \leq 55 \quad (3)$$

$$90 \leq SDa1 < 99 \quad (4)$$

$$25 \leq ETa2 \leq 55 \quad (5)$$

$$99 \leq SDa2 \quad (6),$$

a weight ratio (a1/a 2) of the ethylene-vinyl alcohol copolymers (a1) and (a2) is 5/95 to 95/5, the thermoplastic resin (B) comprises a carbon-carbon double bond which does not encompass multiple bonds contained in aromatic rings, the transition metal salt (C) is contained in a ratio of 1 to 5000 ppm in terms of metal element, based on a total weight of the ethylene-vinyl alcohol copolymer (A) and the thermoplastic resin (B), and an oxygen absorption rate of the resin composition is 0.01 ml/m$^2$ ·day or more.

15. A multilayered structure comprising at least one layer made of the resin composition of claim 2.

16. A multilayered container comprising at least one layer made of the resin composition of claim 2 and at least one thermoplastic polyester layer.

17. The multilayered container of claim 16, wherein two thermoplastic polyester layers are arranged so as to be in direct contact with both surfaces of the layer made of the resin composition.

18. A coinjection blow molded container having a multilayered structure, in which two thermoplastic polyester layers are arranged so as to be in direct contact with both surfaces of a layer made of the resin composition of claim 2.

* * * * *